US010449936B2

(12) United States Patent
Takahashi et al.

(10) Patent No.: US 10,449,936 B2
(45) Date of Patent: Oct. 22, 2019

(54) VEHICLE BRAKING SYSTEM

(71) Applicant: TOYOTA JIDOSHA KABUSHIKI KAISHA, Toyota-shi, Aichi-ken (JP)

(72) Inventors: Akihiro Takahashi, Toyota (JP); Kohji Shibata, Kasugai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/825,835

(22) Filed: Nov. 29, 2017

(65) Prior Publication Data

US 2018/0154875 A1    Jun. 7, 2018

(30) Foreign Application Priority Data

Dec. 2, 2016    (JP) .................................. 2016-235253

(51) Int. Cl.
| | |
|---|---|
| *B60T 8/26* | (2006.01) |
| *B60L 7/18* | (2006.01) |
| *B60L 7/26* | (2006.01) |
| *B60T 7/04* | (2006.01) |

(Continued)

(52) U.S. Cl.
CPC .................. *B60T 8/26* (2013.01); *B60L 7/18* (2013.01); *B60L 7/26* (2013.01); *B60L 50/16* (2019.02); *B60T 1/10* (2013.01); *B60T 7/042* (2013.01); *B60T 8/00* (2013.01); *B60T 8/172* (2013.01); *B60T 8/176* (2013.01); *B60T 13/146* (2013.01); *B60T 13/662* (2013.01); *B60T 13/686* (2013.01); *B60T 13/741* (2013.01); *B60T 13/746* (2013.01); *F16D 61/00* (2013.01); *F16D 65/18* (2013.01); *B60T 8/267* (2013.01); *B60T 8/4081* (2013.01); *B60T 2270/604* (2013.01); *F16D 2121/04* (2013.01); *F16D 2121/24* (2013.01); *F16D 2125/36* (2013.01); *F16D 2125/40* (2013.01);

(Continued)

(58) Field of Classification Search
CPC ............ B60T 8/26; B60T 8/176; B60T 8/172; B60T 7/042; B60T 13/746; B60T 13/741; B60L 7/18; B60L 7/26; F16D 65/18; F16D 2121/04
USPC ....................................................... 303/152
See application file for complete search history.

(56) References Cited

U.S. PATENT DOCUMENTS

| | | | | |
|---|---|---|---|---|
| 7,299,905 | B2 * | 11/2007 | Yamaguchi | ............. B60T 13/02 188/156 |
| 9,150,206 | B2 * | 10/2015 | Nimura | ................... B60L 1/003 |

(Continued)

FOREIGN PATENT DOCUMENTS

| | | |
|---|---|---|
| JP | 11-147458 A | 6/1999 |
| JP | 2007-056952 A | 3/2007 |

*Primary Examiner* — Xuan Lan Nguyen
(74) *Attorney, Agent, or Firm* — Sughrue Mion, PLLC

(57) ABSTRACT

A brake control device is configured such that a hydraulic braking device is provided for one of a front wheel and a rear wheel, and an electric braking device is provided for the other one of them. The electric braking device is provided with a mechanism configured to prohibit retreat of a piston for pressing friction members against a rotor that rotates with the wheel. The brake control device is configured to maintain, by an operation of the mechanism, a braking force that does not depend on a force of an electric motor as a drive force and to control a braking force generated by the hydraulic braking device based on a difference between the braking force thus maintained and a braking force requested for the electric braking device.

11 Claims, 12 Drawing Sheets

(51) Int. Cl.

| | | |
|---|---|---|
| *B60T 8/172* | (2006.01) | |
| *B60T 8/176* | (2006.01) | |
| *B60T 13/74* | (2006.01) | |
| *F16D 65/18* | (2006.01) | |
| *B60T 1/10* | (2006.01) | |
| *B60T 8/00* | (2006.01) | |
| *B60T 13/14* | (2006.01) | |
| *B60T 13/66* | (2006.01) | |
| *B60T 13/68* | (2006.01) | |
| *F16D 61/00* | (2006.01) | |
| *B60L 50/16* | (2019.01) | |
| *F16D 121/04* | (2012.01) | |
| *F16D 121/24* | (2012.01) | |
| *F16D 125/36* | (2012.01) | |
| *F16D 125/40* | (2012.01) | |
| *F16D 125/50* | (2012.01) | |
| *F16D 127/06* | (2012.01) | |
| *F16D 129/10* | (2012.01) | |
| *B60T 8/40* | (2006.01) | |

(52) U.S. Cl.
CPC ...... *F16D 2125/50* (2013.01); *F16D 2127/06* (2013.01); *F16D 2129/10* (2013.01)

(56) References Cited

U.S. PATENT DOCUMENTS

| | | |
|---|---|---|
| 2008/0196529 A1 | 8/2008 | Sugitani |
| 2016/0017942 A1* | 1/2016 | Kwon ................. F16D 65/18 188/162 |

* cited by examiner

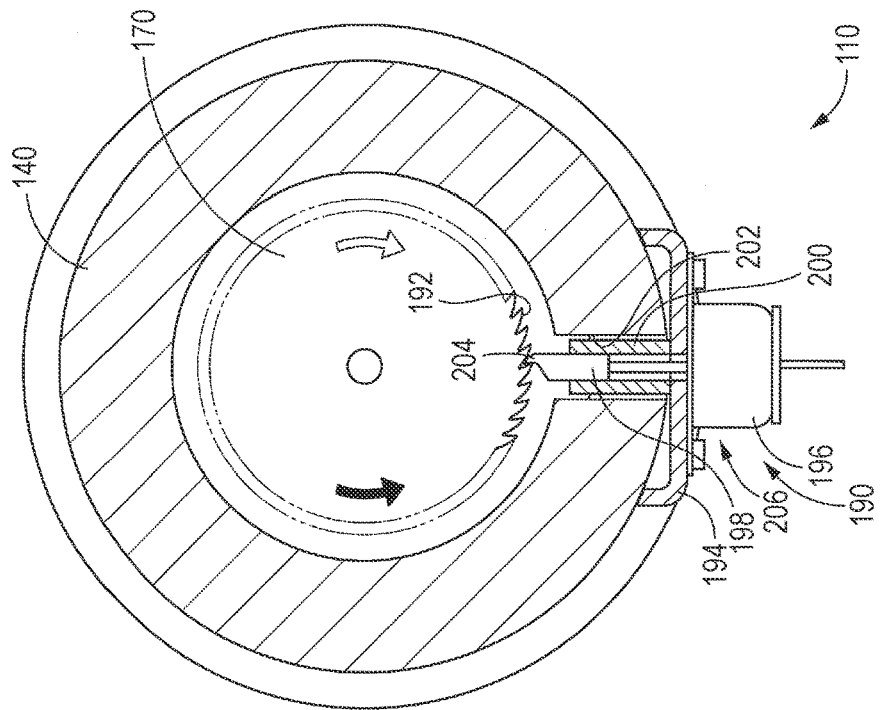
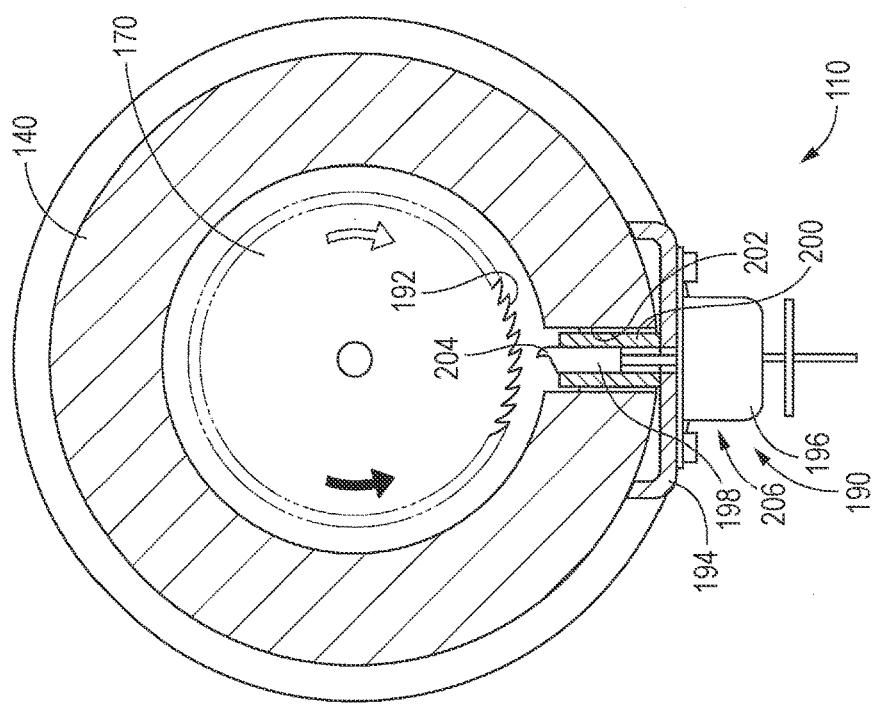

VEHICLE BRAKING SYSTEM

INCORPORATION BY REFERENCE

The disclosure of Japanese Patent Application No. 2016-235253 filed on Dec. 2, 2016 including the specification, drawings and abstract is incorporated herein by reference in its entirety.

BACKGROUND

1. Technical Field

The present disclosure relates to a vehicle braking system. More particularly, the present disclosure relates to a vehicle braking system including an electric braking device for generating a braking force depending on a force of an electric motor.

2. Description of Related Art

In a vehicle braking system including an electric braking device for generating a braking force depending on a force of an electric motor, the following technique has been considered as described in Japanese Patent Application Publication No. 11-147458 (JP 11-147458 A), for example: when a set condition is satisfied, a braking force generated by the electric braking device is maintained at a predetermined magnitude without depending on the force of the electric motor, and when another set condition is satisfied, the braking force thus maintained is released, so as to reduce power consumption of the electric motor.

SUMMARY

However, in the braking system described in JP 11-147458 A, when a braking force required to the electric braking device changes, it is necessary to repeatedly maintain the braking force and release the braking force frequently so as to follow the change, which complicates the control. Accordingly, the braking system has room for improvement to perform the control of the electric brake more easily. The present disclosure provides a vehicle braking system enabling an easier control of an electric braking device.

A vehicle braking system according to an aspect of the present disclosure is configured such that: a hydraulic braking device is provided for one of a front wheel and a rear wheel, and an electric braking device is provided for the other one of them; and the electric braking device is provided with a mechanism configured to prohibit retreat of a piston that presses friction members against a rotor rotating with the wheel. The vehicle braking system is configured to maintain, by an operation of the mechanism, a braking force that does not depend on a force of an electric motor as a drive force and to control a braking force generated by the hydraulic braking device based on a difference between the braking force thus maintained and a braking force necessary for the electric braking device.

According to the vehicle braking system in the aspect of the present disclosure, it is possible to restrain power consumption of the electric braking device by the operation of the mechanism configured to prohibit the retreat of the piston, and to appropriately generate a braking force required to the whole vehicle at that time by the control of the braking force of the hydraulic braking device. As a result, the vehicle braking system of the present disclosure serves as a system having a high practicability.

The following exemplifies some aspects of the disclosure and configurations that can be added to the aspects and describes them. Similarly to Claims, respective numbers are assigned to the terms, so that they are described by referring to the numbers of other terms as needed. This is to merely facilitate the understanding of each term, and is not intended to limit combinations of constituents constituting the present disclosure to what is described in each of the following terms. That is, the present disclosure should be interpreted in consideration of the descriptions associated with respective terms, the descriptions of the embodiments, and so on, and within the interpretation, an aspect obtained by further adding other constituents to an aspect of each term or an aspect obtained by deleting some constituents from an aspect of each term can be considered one aspect of the disclosure.

(1) This term describes one aspect of the disclosure. The aspect provides a vehicle braking system. The vehicle braking system includes: a hydraulic braking device provided for either one of a front wheel and a rear wheel and configured to generate a hydraulic braking force as a braking force depending on a hydraulic pressure of a hydraulic fluid; an electric braking device provided for the other one of the front wheel and the rear wheel and configured to generate an electric braking force as a braking force depending on a force generated by an electric motor, the electric braking device including a rotor configured to rotate together with the other one of the front wheel and the rear wheel, a friction member, and an electric brake actuator including the electric motor as a drive source, a piston configured to be advanced by the electric motor to press the friction member against the rotor, and a piston retreat prohibition mechanism configured to prohibit retreat of the piston; and a control device configured to control the vehicle braking system. In a control of the electric braking device, the control device is configured to execute a normal control to control current application to the electric motor in accordance with a request electric braking force which is a requested electric braking force, and an electric braking force maintaining control to be started instead of the normal control when a setting start condition is satisfied, the electric braking force maintaining control being a control to maintain a maintaining electric braking force without depending on a force of the electric motor, by operating the piston retreat prohibition mechanism and stopping the current application to the electric motor, the maintaining electric braking force being an electric braking force generated by the electric braking device at a time when an operation of the electric braking force maintaining control is started, the control device is configured to restore the normal control in a case where the request electric braking force or a change of the request electric braking force exceeds a predetermined setting maintenance limit during the execution of the electric braking force maintaining control. In a control of the hydraulic braking device, the control device is configured to execute a control in accordance with a request hydraulic braking force which is a requested hydraulic braking force, and to correct the request hydraulic braking force during the execution of the electric braking force maintaining control in a state where a vehicle runs, the request hydraulic braking force being corrected based on a difference between the request electric braking force and the maintaining electric braking force.

The vehicle braking system (hereinafter just referred to as a "system" occasionally) of the present aspect is a system that uses the "hydraulic braking device" and the "electric braking device." The present aspect provides a system that has both an advantage of the hydraulic braking device having a high reliability and an advantage of the electric braking device excellent in response. The hydraulic braking device may be provided for the front wheel and the electric braking device may be provided for the rear wheel, or the electric braking device may be provided for the front wheel and the hydraulic braking device may be provided for the rear wheel. Generally, a front/rear wheel braking force distribution (what is called a ratio between a braking force to the front wheel and a braking force to the rear wheel) is set such that a larger amount of the braking force is distributed to the front wheel as compared to the rear wheel. In consideration of this point, a former aspect in which the hydraulic braking device excellent in reliability is provided for the front wheel is preferable.

The "control device" in the present term may be constituted by a plurality of control devices provided for the hydraulic braking device, the electric braking device, and the after-mentioned regenerative braking device, respectively, or may be one control device that generally controls the plurality of braking devices.

The "piston retreat prohibition mechanism" in the present term may be a mechanism that prohibits the retreat of the piston, but permits the advance thereof, or may be a mechanism that prohibits both retreat and advance. Further, from the viewpoint of energy saving, it is desirable that the piston retreat prohibition mechanism is a mechanism configured such that, in a case where the piston retreat prohibition mechanism operates upon receipt of some sort of energy such as an electric power from outside, when the retreat of the piston is prohibited once, a state where the retreat of the piston is prohibited is maintained even if the supply of the energy is stopped.

The "request electric braking force" and the "request hydraulic braking force" are generally determined based on an operation of a brake operating member such as a brake pedal by a driver. However, in a case where automatic driving or the like is performed, for example, they are not necessarily determined based on the operation of the brake operating member. Even in such a case, the application of the vehicle braking system of the present aspect is not eliminated. Accordingly, the request electric braking force and the request hydraulic braking force in the present term may be determined by some sort of control without depending on the operation of the brake operating member.

From the viewpoint that the "electric braking force maintaining control" is performed as much as possible, in other words, as long as possible, various conditions may be set as the "setting start condition." Specific examples and typical examples of the setting start condition will be described in the following terms. In the meantime, the "condition to restore the normal control" may be considered as such a condition that a request electric braking force, which is a braking force requested to the electric braking device, greatly changes, or suddenly changes. In a case where such a change occurs, it might be undesirable to maintain a uniform electric braking force. That is, it might be desirable for an electric braking force generated actually to follow the request electric braking force. On that account, the above condition in the present term is set. According to this aspect, power supply to the electric motor serving as a drive source for the electric braking device is stopped by the electric braking force maintaining control during the execution of the electric braking force maintaining control, and thus, an excellent braking system in the viewpoint of power consumption is realized.

In most cases, when the request electric braking force changes so as to become quite different from the maintaining electric braking force to some extent, or when the change of the request electric braking force is sudden to some extent, it is required to control the electric braking force to reach the request electric braking force. The "setting maintenance limit" in the present aspect should be set in consideration of such a state. According to the present aspect, in such a case, the electric braking force maintaining control is switched to the normal control appropriately.

Generally, a braking force corresponding to a request whole braking force, which is a braking force requested to the whole vehicle, is often given to the whole vehicle by the hydraulic braking device and the electric braking device (further by a regenerative braking device in a case of a system including the regenerative braking device). During a vehicle running, the request of the braking force to the whole vehicle is particularly large. In the electric braking force maintaining control, the electric braking force is fixed as the maintaining electric braking force. Accordingly, differently from the normal control, it is difficult to generate an electric braking force corresponding to the request whole braking force that changes, by the control of the electric braking device. In the present aspect, during the vehicle running, the request hydraulic braking force is corrected based on a difference between a request electric braking force to be generated by the electric braking device and the maintaining electric braking force that is actually generated. On this account, according to the present aspect, even if the electric braking force is fixed, it is possible to effectively deal with fluctuations of the request whole braking force, so that an appropriate braking force is given to the whole vehicle. Note that, the correction of the request hydraulic braking force is not necessarily limited only to adjusting the difference itself with respect to the request hydraulic braking force, but may adjust an appropriate value corresponding to the difference.

Note that, in the present aspect, even in a system in which a request hydraulic braking force is determined by a brakes operation of a driver in the normal control, for example, the request hydraulic braking force is changed by correction. Accordingly, the hydraulic braking device is preferably configured such that the hydraulic braking force is controllable without depending on the brakes operation of the driver, briefly, it is desirable that the hydraulic braking device be a brake-by-wire-type hydraulic braking device.

When a braking force requested to the whole vehicle is assumed the "request whole braking force," the request electric braking force is generally determined based on the request whole braking force, and a magnitude of the request electric braking force is a magnitude depending on the request whole braking force. In other words, the request electric braking force is a force corresponding to the request whole braking force. Accordingly, in the present aspect and some of the following aspects, instead of using the request electric braking force as a target for the determination of a start condition of the electric braking force maintaining control and a restoration condition of the normal control, the request whole braking force may be used as a target for the determinations of those conditions. That is, the concept "to restore the normal control in a case where the request electric braking force or a change of the request electric braking force exceeds a setting maintenance limit" in the present aspect is the same as a concept "to restore the normal control in a case where the request whole braking force or a change thereof exceeds a setting maintenance limit," and may be treated to include it. Plainly speaking, the latter aspect is also included in the present aspect. Some of the following aspects may be also treated in a similar manner to the present aspect, which will be also mentioned in the descriptions of those aspects.

(2) In the aspect described in (1), the control device may be configured to determine that the setting start condition is satisfied and to start the execution of the electric braking force maintaining control, when the change of the request electric braking force becomes smaller than a setting threshold in a braking in the state where the vehicle runs.

For example, in a case where the driver operates a brake operating member in order to decelerate the vehicle, when a braking force acting to the whole vehicle (hereinafter referred to as a "whole braking force" occasionally) generally comes closer to a desired braking force of the driver, the brakes operation starts to become stable. In other words, the change of the request electric braking force based on the brakes operation becomes small, and eventually, the request electric braking force reaches a request electric braking force that can provide a desired whole braking force. According to the above configuration, the electric braking force maintaining control can be started when a sign that the brakes operation is to become stable has appeared as a trigger. In other words, in the above configuration, it is considered that, when a change slope of the request electric braking force is decreased to some extent, the electric braking force maintaining control is started. According to the present aspect, the electric braking force maintaining control is started at an appropriate timing.

Similarly to the aspect in the previous term, the concept that "the change of the request electric braking force becomes smaller than a setting threshold" in the present aspect includes a concept that "the change of the request whole braking force becomes smaller than a setting threshold," and the latter aspect is also included in the present aspect.

(3) In the aspect described in (1), the control device may be configured to determine that the setting start condition is satisfied and to start the execution of the electric braking force maintaining control, when a generated electric braking force exceeds a braking force requested to the electric braking device to maintain a stop state of the vehicle, in a state where the vehicle stops.

The above configuration is an effective aspect for power saving of the electric braking device in the state where the vehicle stops. The "braking force requested to the electric braking device to maintain the stop state of the vehicle (also referred to as a "vehicle hold achievable electric braking force" occasionally)" in the present term may be a braking force set such that the stop state of the vehicle can be maintained only by the electric braking force, or may be a braking force set such that the stop state of the vehicle can be maintained by a specific hydraulic braking force on the premise that such a specific hydraulic braking force exists. For example, in the electric braking force maintaining control at the time when the vehicle stops, in the former case, it is not necessary to generate a hydraulic braking force, and in the latter case, it is necessary to generate only some hydraulic braking force. According to the present aspect, by controlling the hydraulic braking force as such, it is possible to achieve power saving in the hydraulic braking device.

Similarly to the previous term, the concept that "when the generated electric braking force exceeds a braking force requested to the electric braking device to maintain the stop state of the vehicle" includes a concept that "when a generated whole braking force exceeds a braking force requested to the whole vehicle braking system to maintain the stop state of the vehicle," and the latter case is also included in the configuration of the present term.

(4) In the aspect described in (1), the control device may be configured to determine that the setting maintenance limit is exceeded and to restore the normal control, when the request electric braking force falls below or is expected to fall below the maintaining electric braking force during the execution of the electric braking force maintaining control.

For example, in a case where the brakes operation by the driver is finished, the request electric braking force becomes smaller than the maintaining electric braking force generated during the execution of the electric braking force maintaining control, or is expected to become smaller than that. According to the present aspect, in such a case, the electric braking force maintaining control is switched to the normal control. In order to follow the decrease in the request electric braking force appropriately, it is desirable that the switching be performed at a time point that the request electric braking force is expected to fall below the maintaining electric braking force. More specifically, when the request electric braking force falls below a threshold braking force set higher than the maintaining electric braking force to some extent, the normal control should be restored.

Similarly to the previous term, the concept that "when the request electric braking force falls below or is expected to fall below the maintaining electric braking force" in the present aspect includes a concept that "when the request whole braking force falls below or is expected to fall below the whole braking force at a time when the electric braking force maintaining control is started," and the latter aspect is also included in the configuration of the present term.

(5) In the aspect described in (1), the control device may be configured to determine that the setting maintenance limit is exceeded and to restore the normal control, when the request electric braking force becomes larger than an upper limit braking force obtained by adding a predetermined allowable increment to the maintaining electric braking force during the execution of the electric braking force maintaining control.

For example, even when the driver performs a stable brakes operation, it is also expected that a degree of the brakes operation is increased depending on some situations. More specifically, the degree of the brakes operation may be increased in a case where the driver performs an operation to step a brake pedal further, for example. In this case, in the electric braking force maintaining control, an increment of the request electric braking force from the maintaining electric braking force is covered only by the hydraulic braking force. However, in a case where the increment becomes large to some extent, it might be desirable to also increase the electric braking force. According to the configuration of the present term, in such a case, the electric braking force maintaining control is switched to the normal control, so that an appropriate braking force is given to the vehicle by the hydraulic braking force and the electric braking force.

Similarly to the previous term, the concept that "when the request electric braking force becomes larger than an upper limit braking force obtained by adding an allowable increment to the maintaining electric braking force" in the present aspect includes a concept that "when the request whole braking force becomes larger than an upper limit braking force obtained by adding an allowable increment to the whole braking force at a time when the electric braking force maintaining control is started" and the latter aspect is also included in the configuration of the present term.

(6) In the aspect described in (1), the control device may be configured to execute an anti-lock control, and the control device may be configured to stop the execution of the electric braking force maintaining control in a state where the anti-lock control is executed during the execution of the electric braking force maintaining control.

The so-called "anti-lock control (also referred to as an "anti-skid control" occasionally)" is a control to cancel a slip state when the wheels are locked to enter the slip state, and a braking force to the wheels thus locked is limited. Accordingly, it is preferable to stop the electric braking force maintaining control in which the maintaining electric braking force is kept generated by the electric braking device. The present aspect is an aspect in consideration of such a case. It may be preferable to perform the anti-lock control in emergency. Further, it is desirable to restore the normal control based on a sign before the anti-lock control is started. Generally, the anti-lock control is started such that a difference between an actual wheel rotation speed and an estimated wheel rotation speed, which is estimated from a vehicle running speed, is taken as a parameter, and when the parameter exceeds a given threshold, the anti-lock control is started. Accordingly, in the present aspect, for example, when the parameter exceeds another threshold set smaller than the above threshold, the electric braking force maintaining control is switched to the normal control, so that the switching can be performed without being late for the start of the anti-lock control.

(7) In the aspect described in (1), the control device may be configured to execute a parking control to operate the piston retreat prohibition mechanism at a time when the vehicle is parked.

According to this configuration, the electric braking device can have a function as a so-called parking brake. In this configuration, it may be considered that, in the system including the electric braking device having the parking brake, the electric braking force maintaining control can be performed by operating the parking brake.

(8) In the aspect described in (1), the control device may be configured to determine a request whole braking force which is a braking force requested to a whole of the vehicle, and to determine the request hydraulic braking force and the request electric braking force in accordance with a predetermined setting distribution, based on the request whole braking force.

The configuration of the present term is a configuration in which a limitation about the determination of the request hydraulic braking force and the request electric braking force based on the request whole braking force is added. According to this configuration, it is possible to determine the request hydraulic braking force and the request electric braking force relatively easily. The "setting distribution" may be a fixedly set distribution, that is, the setting distribution may be set as a single distribution, or may be set to change depending on a vehicle running speed, or whether or not the after-mentioned regenerative braking force exists. Note that the configuration of the present term does not necessarily require determining the request hydraulic braking force and the request electric braking force only based on the request whole braking force. For example, in a case of a system including the after-mentioned regenerative braking device, the request hydraulic braking force and the request electric braking force may be determined based on a regenerative braking force to be generated.

(9) In the configuration described in (8), the vehicle braking system may include a regenerative braking device provided for at least one of the front wheel and the rear wheel and configured to generate a regenerative braking force which is a braking force using power generation by a rotation of the at least one of the front wheel and the rear wheel. The control device may be configured to determine the request electric braking force and the request hydraulic braking force in accordance with the predetermined setting distribution, based on an insufficient braking force in the request whole braking force, the insufficient braking force being a braking force that is not covered by the regenerative braking force.

In the configuration of the present term, the request hydraulic braking force and the request electric braking force are determined also based on the regenerative braking force. This configuration is effective in a case where the regenerative braking force is desired to be generated preferentially, in other words, in a case where a possibly large regenerative braking force is desired to be generated.

(10) In the configurations described in (8), the vehicle braking system may include a brake operating member configured to receive a brakes operation by a driver. The control device may be configured determine the request whole braking force in accordance with the brakes operation.

According to the configuration of the present term, it is possible to give the request whole braking force in accordance with the intention of the driver to the vehicle. Note that, in order to determine the request whole braking force in accordance with the brakes operation, some sort of parameter indicating a degree of the brakes operation, such as a brake operation amount, which is an operation amount of the brake operating member, and a brake operation force, which is a force to be applied to the brake operating member by the driver, is detected, for example, and the request whole braking force should be determined based on a value of the parameter thus detected.

(11) In the aspect described in (1), the piston retreat prohibition mechanism may include an engaging member configured to be engaged with the piston or an interlocking body moving in conjunction with the piston, an engaging member moving device configured to move, upon receipt of supply of an energy from outside, the engaging member from a position where the engaging member is not engageable with the piston or the interlocking body to a position where the engaging member is engageable with the piston or the interlocking body, the engaging member moving device being configured to return the engaging member to the position where the engaging member is not engageable with the piston or the interlocking body, when the supply of the energy is stopped, and a one-way clutch mechanism configured to prohibit the retreat of the piston, and to permit advance of the piston in an engaged state where the engaging member is engaged with the piston or the interlocking body. The piston retreat prohibition mechanism may be configured such that, in the engaged state, even when the supply of the energy is stopped, the engaged state is maintained unless the piston advances, and when the piston is advanced in the engaged state with the supply of the energy being stopped, the engaged state is released.

According to the configuration of the present term, the piston retreat prohibition mechanism can maintain the electric braking force at the maintaining electric braking force without the energy supply from outside, which makes it possible to build an energy-saving system. The "one-way clutch mechanism" in the present term is a mechanism configured to permit only an operation in one direction out of two directions opposite to each other. As the "one-way clutch mechanism," a ratcheting mechanism constituted by ratchet teeth and a lug may be employed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a view illustrating a state where a locking rod is placed at a position where a lug of the locking rod is not engageable with ratchet teeth, in a sectional view of a section different from FIG. 5, so as to describe a piston retreat prohibition mechanism included in the electric brake actuator of FIG. 5;

FIG. 6B is a view illustrating a state where the locking rod is placed at a position where the lug is engageable with the ratchet teeth, in the sectional view illustrated in FIG. 6A;

DETAILED DESCRIPTION OF EMBODIMENTS

The following describes details of a vehicle braking system according to an embodiment as a mode for carrying out the present disclosure with reference to the drawings, and also describes modifications of the vehicle braking system. Note that the present disclosure can be performed in various modes including various alterations and modifications made based on knowledge of a person skilled in the art, in addition to the modes described in SUMMARY as well as the following embodiment and modifications.

[A] Summary of Vehicle Drive System and Vehicle Braking System

Figure 1:
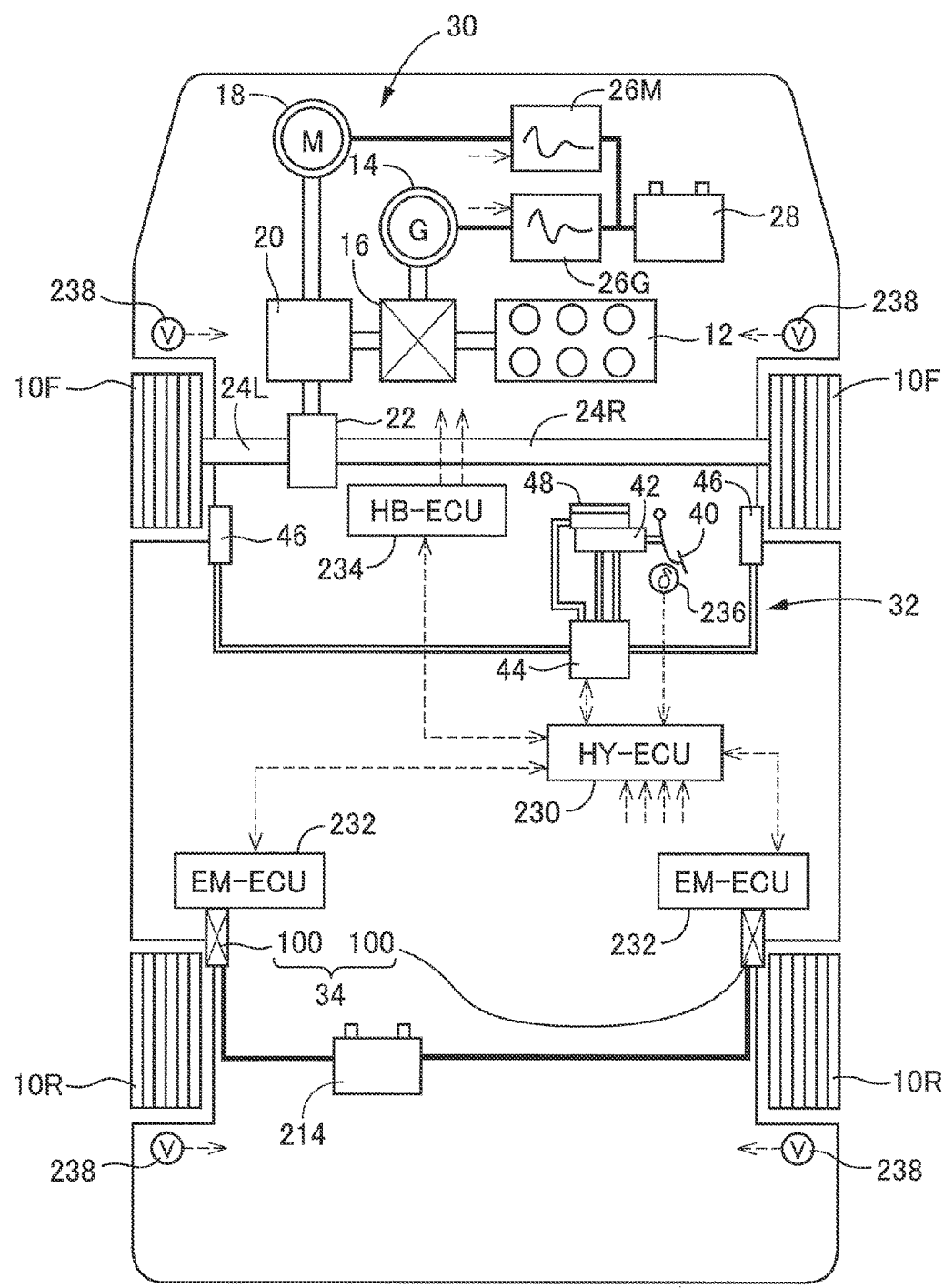
FIG. 1 is a conception diagram illustrating an overall configuration of a vehicle braking system in an embodiment.

A vehicle provided with a vehicle braking system of the embodiment is a hybrid vehicle including two front wheels 10F and two rear wheels 10R, as schematically illustrated in FIG. 1, and the two front wheels 10F serve as driving wheels. First described is a vehicle drive system. The vehicle drive system provided in the vehicle includes an engine 12 as a drive source, a generator 14 mainly functioning as an electric generator, a power distribution mechanism 16 to which the engine 12 and the generator 14 are connected, and an electric motor 18 as another drive source.

The power distribution mechanism 16 has a function to divide a rotation of the engine 12 into a rotation of the generator 14 and a rotation of an output shaft. The electric motor 18 is connected to the output shaft via a reduction mechanism 20 functioning as a speed reducer. The rotation of the output shaft is transmitted via a differential mechanism 22 and drive shafts 24L, 24R, so that the right and left front wheels 10F are rotationally driven. The generator 14 is connected to a battery 28 via an inverter 26G, so that an electrical energy obtained by power generation of the generator 14 is stored in the battery 28. Further, the electric motor 18 is also connected to the battery 28 via an inverter 26M, and an operation of the electric motor 18 and an operation of the generator 14 are controlled by controlling the inverter 26M and the inverter 26G.

Roughly, as schematically illustrated in FIG. 1, the vehicle braking system of the embodiment to be provided in the vehicle is constituted by (a) a regenerative braking device 30 configured to give a braking force to each of the two front wheels 10F, (b) a hydraulic braking device 32 configured to give a braking force to each of the two front wheels 10F separately from the braking force from the regenerative braking device 30, and (c) an electric braking device 34 configured to give a braking force to each of the two rear wheels 10R.

[B] Configuration of Regenerative Braking Device

The regenerative braking device 30 can be considered to constitute a part of the vehicle drive system from the viewpoint of hardware. At the time of vehicle deceleration, the electric motor 18 rotates by the rotation of the front wheels 10F without receiving an electric power supplied from the battery 28. Using an electromotive force to be generated by the rotation, the electric motor 18 generates an electric power, and the electric power thus generated is stored in the battery 28 via the inverter 26M as an amount of electricity. That is, the electric motor 18 is functionalized as a generator, so that the battery 28 is charged. The rotation of the front wheels 10F, that is, the vehicle is decelerated only by an energy corresponding to the amount of electricity thus charged. In the vehicle, the regenerative braking device 30 is configured as such. A braking force (hereinafter also referred to as a "regenerative braking force" occasionally) given to the front wheels 10F from the regenerative braking device 30 depends on a power generation amount, and a regenerative braking force to be generated is controlled by controlling the inverter 26M. A regenerative braking device having a general configuration can be employed as the regenerative braking device 30, and therefore, detailed descriptions of the regenerative braking device 30 are omitted herein.

[C] Configuration of Hydraulic Braking Device i) Overall Configuration

Roughly, the hydraulic braking device 32 includes (a) a master cylinder 42 to which a brake pedal 40 as a brake operating member operated by a driver is connected, (b) an actuator unit 44 configured to supply a hydraulic fluid from the master cylinder 42 by passing the hydraulic fluid therethrough or to adjust a pressure of a hydraulic fluid pressurized by a pump (described later) provided therein so as to supply the hydraulic fluid, and (c) two wheel brakes 46 provided for respective right and left front wheels 10F and configured to decelerate respective rotations of the right and left front wheels 10F by a pressure of the hydraulic fluid supplied from the actuator unit 44. Incidentally, the hydraulic braking device 32 is a device including two systems corresponding to the right and left front wheels 10F. Note that the actuator unit 44 can be regarded as a brake actuator in which a plurality of constituents is integrated, and functions as a pressure-adjusting device configured to adjust and supply the hydraulic fluid.

ii) Configuration of Master Cylinder

Figure 2:
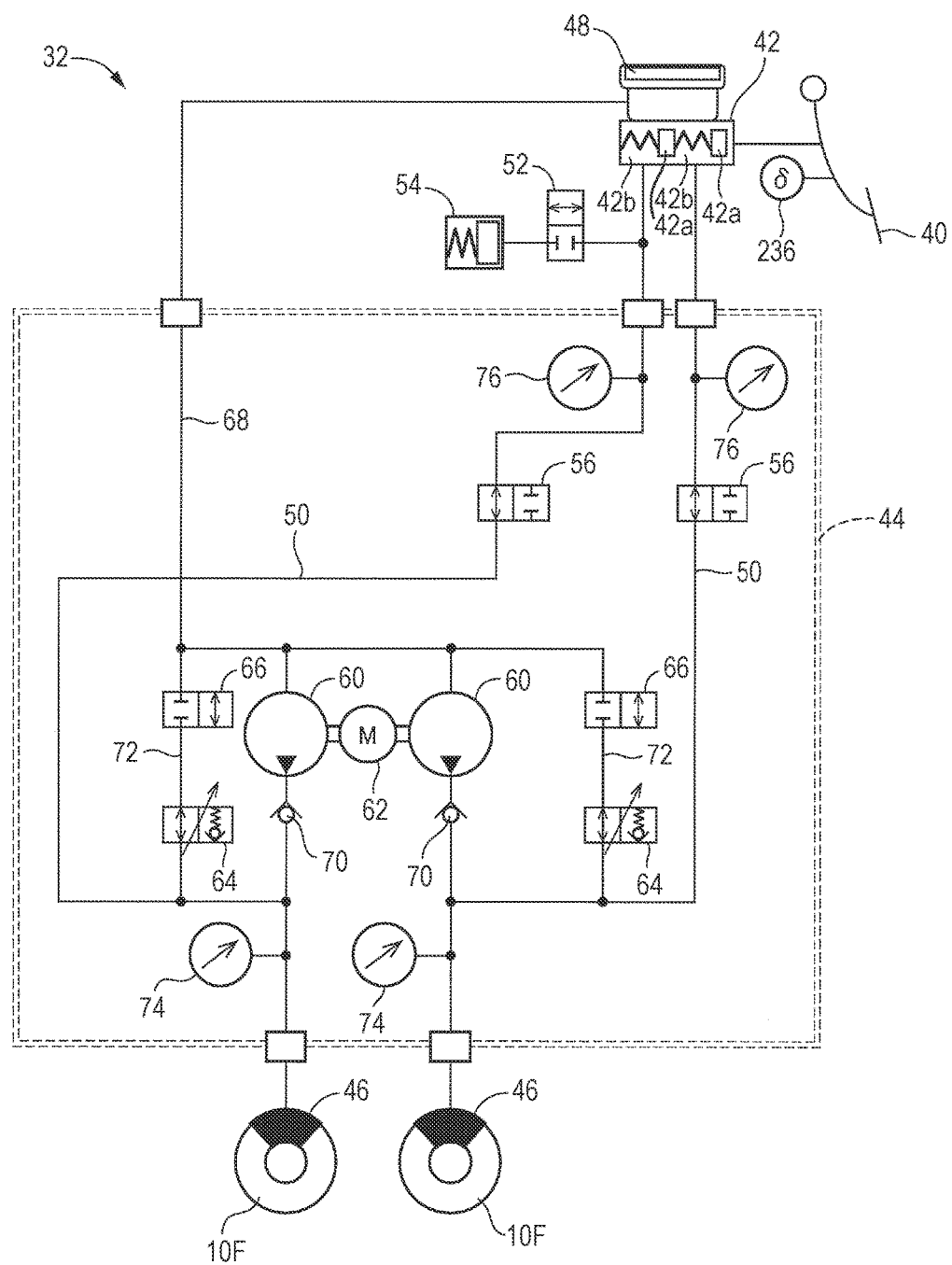
FIG. 2 is a hydraulic pressure circuit diagram of a hydraulic braking device constituting the vehicle braking system illustrated in FIG. 1.

As illustrated in FIG. 2, the master cylinder 42 is a tandem cylinder device configured such that two pistons 42a connected to the brake pedal 40 and placed serially to each other and two pressurizing chambers 42b in which hydraulic fluids introduced therein are pressurized by movements of respective pistons 42a are provided in a housing, and a reservoir 48 in which the hydraulic fluid is accumulated under an atmospheric pressure is attached thereto. That is, the reservoir 48 is placed near the master cylinder 42, and the hydraulic fluids from the reservoir 48 are pressurized in the two pressurizing chambers 42b. The master cylinder 42 supplies the hydraulic fluids with pressures corresponding to a force (hereinafter also referred to as a "brake operation force" occasionally) applied to the brake pedal 40, to the actuator unit 44 through two systems corresponding to the two front wheels 10F. More specifically, the actuator unit 44 is provided with liquid passages for directing, to the wheel brakes 46, the hydraulic fluids supplied from the master cylinder 42 therethrough, and the hydraulic braking device 32 includes liquid passages for supplying the hydraulic fluids from the master cylinder 42 to the wheel brakes 46, namely, two master liquid passages 50. That is, in the hydraulic braking device 32, the hydraulic fluids can be supplied from the master cylinder 42 to respective wheel brakes 46 through the master liquid passages 50. Note that the wheel brake 46 includes a wheel cylinder (described later), and the hydraulic fluid is supplied to the wheel cylinder.

Further, a stroke simulator 54 is connected to one of the master liquid passages 50 via a simulator opening valve 52, which is a normally-closed electromagnetic opening/closing valve. At the time of a normal operation (at the time when no electrical failure occurs), the simulator opening valve 52 is excited to be opened, so that the stroke simulator 54 functions. As will be described later, at the time of the normal operation, two master cut valves 56, which are electromagnetic opening/closing valves provided in the actuator unit 44 so as to correspond to the two systems, are closed. Accordingly, the stroke simulator 54 secures a stepping stroke of the brake pedal 40 and gives, to the brake pedal 40, an operation reaction force corresponding to the stepping stroke. That is, the stroke simulator 54 functions as means for improving a feeling of a brakes operation at the time of the normal operation.

iii) Configuration of Actuator Unit

The actuator unit 44 includes: two master cut valves 56, which are normally-opened electromagnetic opening/closing valves configured to open and close the aforementioned two master liquid passages 50, respectively; two pumps 60 corresponding to the two systems; a motor 62 for driving the pumps 60; two control retaining valves 64, which are electromagnetic linear valves corresponding to the two systems; and two shut-off valves 66, which are generally-closed electromagnetic opening/closing valves placed in serial to the control retaining valves 64. The hydraulic braking device 32 is provided only with one reservoir, and the two pumps 60 are configured to pump up the hydraulic fluid from the reservoir 48. On this account, a reservoir liquid passage 68 that connects the two pumps 60 to the reservoir 48 is provided, and a part of the reservoir liquid passage 68 is formed inside the actuator unit 44. The pumps 60 are connected to respective master liquid passages 50 on a discharge side, so as to supply the pressurized hydraulic fluid to respective wheel brakes 46 via part of the master liquid passages 50. Note that check valves 70 for preventing counterflow of the hydraulic fluid to respective pumps 60 are provided on the discharge sides of the pumps 60. Further, two return paths 72 that connect respective master liquid passages 50 to the reservoir liquid passage 68 are formed in parallel with the respective pumps 60 inside the actuator unit 44, and respective control retaining valves 64 and respective shut-off valves 66 are provided in respective return paths 72.

At the time of the normal operation, the master cut valves 56 are closed and the shut-off valves 66 are opened. When the pumps 60 are driven by the motor 62, the hydraulic fluid in the reservoir 48 is pressurized and supplied to the wheel brakes 46. The control retaining valve 64 has a function to adjust a pressure of the hydraulic fluid supplied to the wheel brake 46 to a pressure according to a current supplied to the control retaining valve 64. In other words, the control retaining valve 64 is a decompression electromagnetic linear valve having a function to decrease the pressure. Accordingly, in the hydraulic braking device 32, the hydraulic fluid having a pressure adjusted by the control of the control retaining valve 64 without depending on a pressure of the hydraulic fluid supplied from the master cylinder 42, that is, without depending on a brake operation force applied to the brake pedal 40 is supplied to the wheel brake 46. Note that the control retaining valve 64 is a valve for decompression, so that the hydraulic fluid passes through the control retaining valve 64 for adjustment of the pressure. The hydraulic fluid thus passing therethrough is returned to the reservoir liquid passage 68, eventually, the reservoir 48 through the return path 72 and the shut-off valve 66 in an opened state.

Incidentally, in a case where the hydraulic braking device 32 fails electrically, the master cut valves 56 are opened and the shut-off valves 66 are closed, and the hydraulic fluids supplied from the master cylinders 42 to the actuator unit 44 are supplied to the wheel brakes 46. In other words, at the time when the master cut valves 56 as the opening/closing valves are opened so that the after-mentioned wheel cylinders are operated by the hydraulic fluids supplied from the master cylinders 42, the shut-off valves 66 shut off flows of the hydraulic fluids flowing into the reservoir 48 or the reservoir liquid passage 68. Note that two wheel cylinder pressure sensors 74 for detecting pressures (hereinafter also referred to as "wheel cylinder pressures" occasionally) of the hydraulic fluids supplied to the wheel brakes 46, and two master pressure sensors 76 for detecting pressures (hereinafter also referred to as "master pressures" occasionally) of the hydraulic fluids supplied from the master cylinders 42 are provided so as to correspond to the two systems.

iv) Configuration of Wheel Brake

Figure 3:
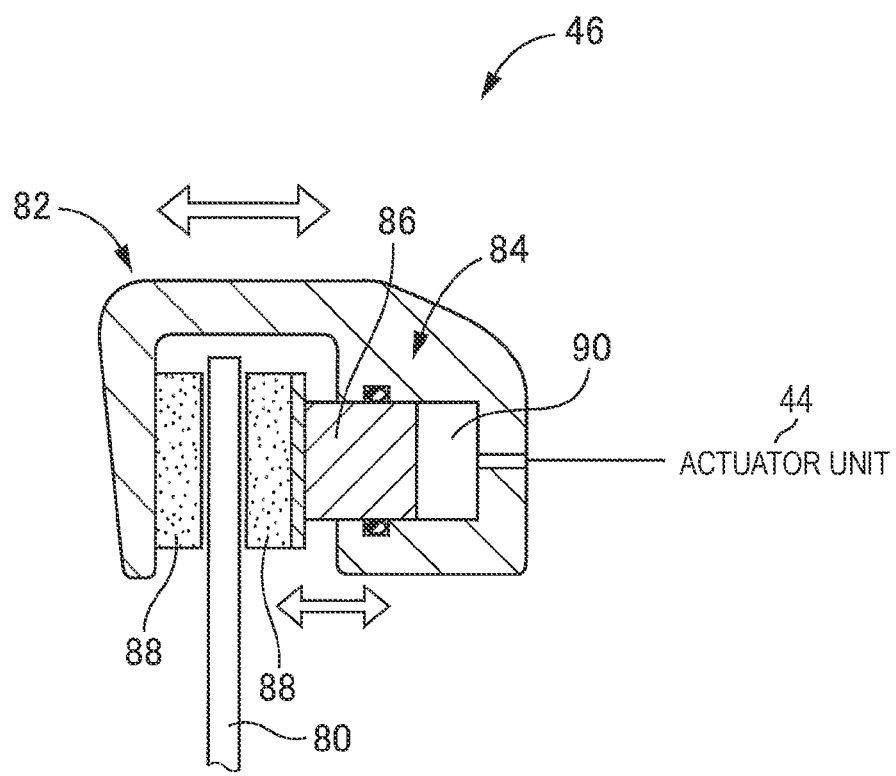
FIG. 3 is a sectional view illustrating a wheel brake of the hydraulic braking device constituting the vehicle braking system illustrated in FIG. 1.

The wheel brakes 46 configured to stop respective rotations of the front wheels 10F are a disc brake gear as schematically illustrated in FIG. 3. The wheel brake 46 includes a disc rotor 80 as a rotor rotating integrally with the front wheel 10F, and a brake caliper (hereinafter just referred to as a "caliper" occasionally) 82 movably supported by a carrier that holds the front wheel 10F rotatably. The caliper 82 includes a wheel cylinder 84 provided inside a part of the caliper 82 as a housing. A pair of brake friction pads (one type of a friction member) 88 are provided, respectively, on a tip end side of a piston 86 included in the wheel cylinder 84 and on an opposite side to a part of the caliper 82 in which part the wheel cylinder 84 is provided, such that the brake friction pads 88 are locked thereto and opposed to each other across a disc rotor 80.

The hydraulic fluid from the actuator unit 44 is supplied to a hydraulic fluid chamber 90 of the wheel cylinder 84, so that the disc rotor 80 is sandwiched between the pair of brake friction pads 88 by a pressure of the hydraulic fluid. That is, due to an operation of the wheel cylinder 84, the brake friction pads 88 as the friction members are pressed against the disc rotor 80. As such, the wheel brake 46 generates a braking force to stop the rotation of the front wheel 10F, that is, a braking force (hereinafter also referred to as a "hydraulic braking force" occasionally) to brake the vehicle, by use of frictional forces. The hydraulic braking force has a magnitude corresponding to a pressure of the hydraulic fluid supplied from the actuator unit 44. Since the wheel brake 46 has a general structure, detailed descriptions of the wheel brake 46 are omitted.

[D] Configuration of Electric Braking Device

The electric braking device 34 includes a pair of wheel brakes 100 to stop respective rotations of the rear wheels 10R, as illustrated in FIG. 1. The wheel brake 100 operates by a force of an electric motor, whereas the wheel brake 46 of the hydraulic braking device 32 operates by the pressure of the hydraulic fluid. Further, differently from the wheel brake 46 of the hydraulic braking device 32, the wheel brake 100 functions as a disc brake gear provided with the electric motor as a drive source so as to operate independently. That is, the electric braking device 34 is constituted by a pair of disc brake gears, and therefore, in the following description, the wheel brake 100 itself is referred to as an electric braking device 100. In other words, the electric braking device 34 is constituted by a pair of electric braking devices 100.

i) Brake Caliper

Figure 4:
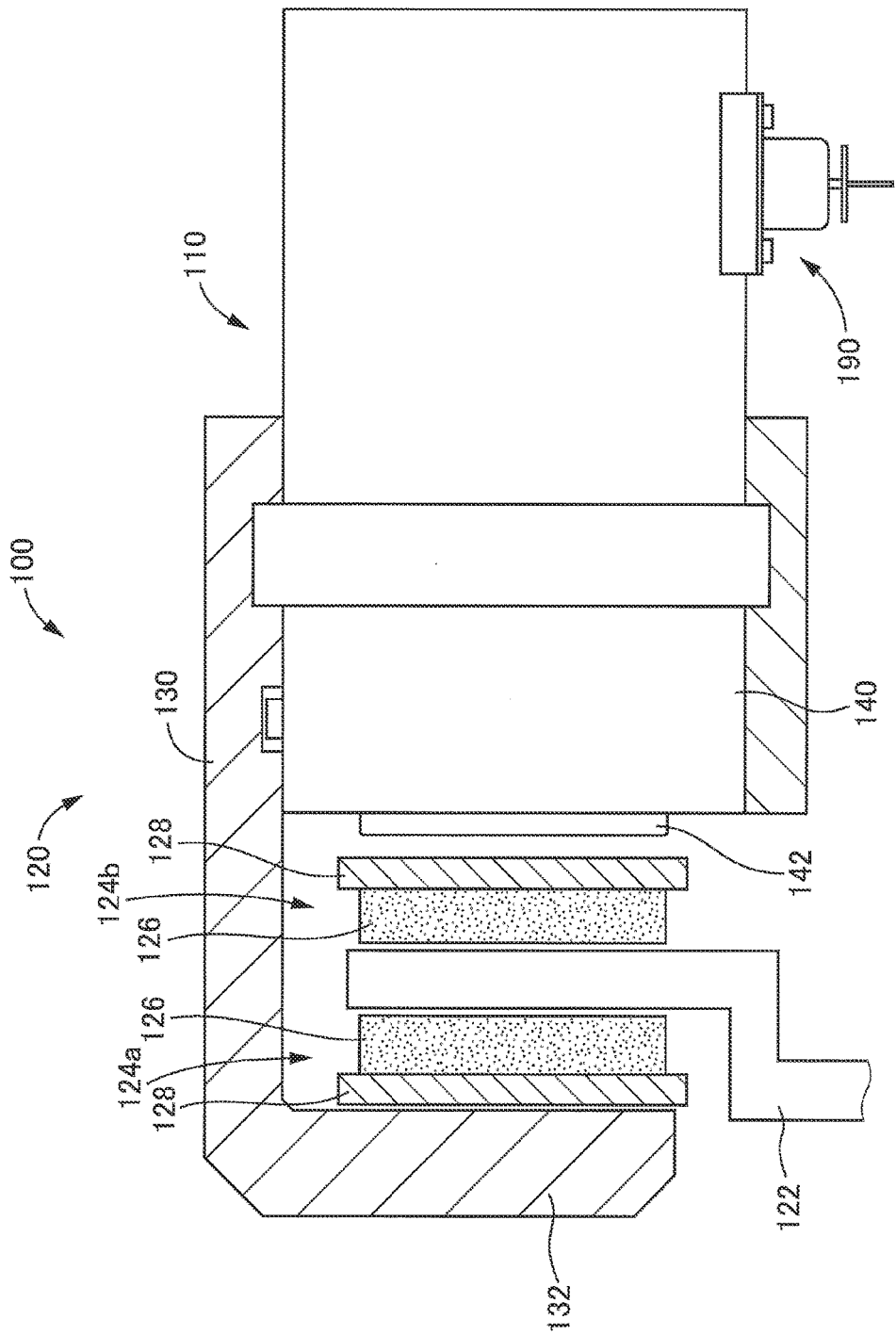
FIG. 4 is a sectional view illustrating an electric braking device (a wheel brake) constituting the vehicle braking system illustrated in FIG. 1.

As illustrated in FIG. 4, the electric braking device 100 includes: a brake caliper (hereinafter just referred to as a "caliper" occasionally) 120 including an electric brake actuator (hereinafter just referred to as an "actuator" occasionally) 110; and a disc rotor 122 as a rotor rotating integrally with the rear wheel 10R. The caliper 120 is held movably in an axis direction (a right-left direction in the figure) by a mount (not shown) provided over the disc rotor 122 in a carrier (not shown) that holds the rear wheel 10R rotatably. A pair of brake friction pads (hereinafter just referred to as "pads" occasionally) 124a, 124b are held by the mount so as to sandwich the disc rotor 122 in a state where their movements in the axis direction are permitted. The pads 124a, 124b are each constituted by a friction member 126 placed on a side making contact with the disc rotor 122, and a backup plate 128 that supports the friction member 126, and the friction member 126 is pressed against the disc rotor 122.

For descriptive purposes, a left side in the figure is assumed a front side and a right side is assumed a rear side. The pad 124a on the front side is supported by a detent portion 132, which is a front end of a caliper main body 130. The actuator 110 is held such that a housing 140 of the actuator 110 is fixed to a rear part of the caliper main body 130. The actuator 110 includes a piston 142 that advances and retreats relative to the housing 140, and when the piston 142 advances, its front part, more specifically, its front end is engaged with the pad 124b on the rear side, more specifically, the backup plate 128 of the pad 124b. When the piston 142 further advances in an engaged state, the pair of pads 124a, 124b sandwich the disc rotor 122. In other words, the pair of pads 124a, 124b are pressed against the disc rotor 122. This pressing generates a braking force to the rotation of the rear wheel 10R, that braking force depending on a frictional force between the disc rotor 122 and the friction member 126, that is, the pressing generates a braking force (hereinafter referred to as an "electric braking force" occasionally) to decelerate or stop the vehicle.

ii) Electric Brake Actuator

Figure 5:
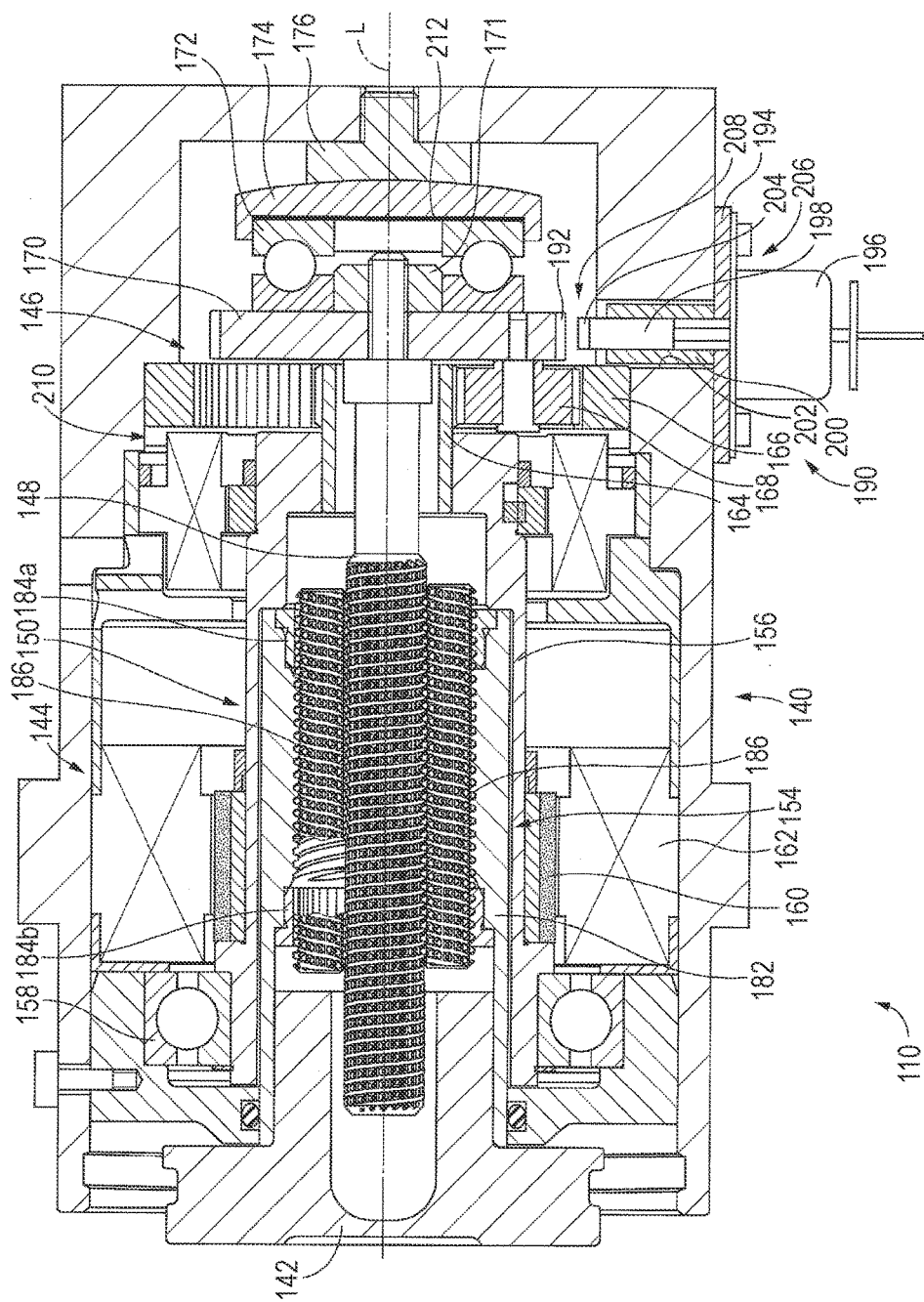
FIG. 5 is a sectional view illustrating an electric brake actuator included in the electric braking device of FIG. 4.

As illustrated in FIG. 5, in addition to the abovementioned housing 140 and the abovementioned piston 142, the actuator 110 includes: an electric motor 144 as a drive source; a deceleration mechanism 146 for decelerating a rotation of the electric motor 144; an motion conversion mechanism 150 including an input shaft 148 rotated by the rotation of the electric motor 144 thus decelerated via the deceleration mechanism 146 and configured to convert a rotative motion of the input shaft 148 into a linear motion (advance/retreat operation) of the piston 142; and so on. Note that, in the following description, the left side in the figure is referred to as the front side and the right side in the figure is referred to as the rear side for descriptive purposes.

The piston 142 is fixedly supported such that the piston 142 is inserted into an output cylinder 154 as a constituent of the motion conversion mechanism 150, and the piston 142 and the output cylinder 154 are non-rotatable relative to the housing 140. Meanwhile, the electric motor 144 includes a cylindrical rotary drive shaft 156. The output cylinder 154 is disposed inside the rotary drive shaft 156 and the input shaft 148 as a constituent of the motion conversion mechanism 150 is disposed inside the output cylinder 154 such that the output cylinder 154 and the input shaft 148 are coaxial to each other, more specifically, respective axes of the rotary drive shaft 156, the output cylinder 154, and the input shaft 148 are placed along an axis L, which is a common axis to them. As a result, the actuator 110 has a compact structure.

The rotary drive shaft 156 is held by the housing 140 so as to be rotatable via a radial bearing 158, but immovable in its axis direction (a direction where the axis L extends and a right-left direction in the figure). The electric motor 144 is constituted by magnets 160 placed circumferentially on an outer periphery of the rotary drive shaft 156, and a coil 162 fixed to an inner periphery of the housing 140 so as to surround the magnets 160.

The deceleration mechanism 146 is a planetary-gear deceleration mechanism constituted by a hollow sun gear 164 fixedly attached to a rear end of the rotary drive shaft 156, a ring gear 166 fixed to the housing 140, and a plurality of planetary gears 168 (only one of them is illustrated in the figure) engaged with both the sun gear 164 and the ring gear 166 so as to rotate around the sun gear 164. Each of the plurality of planetary gears 168 is axially rotatably held by a flange 170 as a carrier. The flange 170 is fixed to the input shaft 148 such that the flange 170 is sandwiched between the input shaft 148 and a nut 171 threadedly engaged with an external screw thread portion formed in a rear end of the input shaft 148, and the flange 170 rotates integrally with the input shaft 148. The rotation of the rotary drive shaft 156, that is, the rotation of the electric motor 144 is decelerated and transmitted as a rotation of the input shaft 148 via the deceleration mechanism 146 configured as such.

Incidentally, the input shaft 148 is supported rotatably but immovably in the axial direction by the housing 140, more specifically, by a seat 176 threadedly engaged with the housing 140 in a fixed manner, via the flange 170, a thrust bearing 172, and a support plate 174. A surface on the rear side of the support plate 174 is a part of a projecting spherical surface having a relatively large diameter, and a surface on the front side of the seat 176 is a part of a recessed spherical surface fitted to the surface on the rear side of the support plate 174. Those surfaces make sliding contact with each other so as to permit slight radial displacement of the support plate 174. Hereby, tilting of the input shaft 148 relative to the axis L, that is, tilting of the piston 142 relative to the axis L is permitted. This tilting makes it possible to generate an appropriate braking force even in a state where the brake friction pads 124a, 124b are eccentrically worn (a phenomenon in which a part on one side is worn more largely than a part on the other side), for example.

The motion conversion mechanism 150 is constituted by the input shaft 148, the output cylinder 154, and a plurality of planet rollers 186 disposed between an outer periphery of the input shaft 148 and an inner periphery of the output cylinder 154 such that each of the planet rollers 186 revolves around the input shaft 148 and rotates on its own axis. The motion conversion mechanism 150 is a so-called planetary differential type motion conversion mechanism, and is configured to convert a rotative motion of the input shaft 148 into a linear motion of the output cylinder 154. The output cylinder 154 is constituted by a cylinder main body 182, and two ring gears 184 fixedly inserted into both ends of the cylinder main body 182 in the axis direction, more specifically, a rear end part and a part close to the front side. Incidentally, as the plurality of planet rollers 186, four planet rollers 186 are disposed at four equally spaced positions in a circumferential direction (only two of them are illustrated in the figure) in the motion conversion mechanism 150.

An external thread and gear teeth are formed on an outer periphery of the input shaft 148 in the same region in the axis direction. An external thread and gear teeth are also formed on an outer periphery of each of the four planet rollers 186 in the same region in the axis direction. In other words, a region where the external thread is formed and a region where the gear teeth are formed overlap with each other so as to correspond to each other. Accordingly, it seems like that texture is formed on an outer peripheral surface of the input shaft 148 and outer peripheral surfaces of the planet rollers 186 by the external threads and the gear teeth.

In the meantime, in the output cylinder 154, an internal thread is formed on the cylinder main body 182 and gear teeth are formed on each of the two ring gears 184 fixed to the cylinder main body 182, in consideration of easiness of machining to form the internal thread and the gear teeth. Accordingly, on an inner periphery of the output cylinder 154, the internal thread is formed in an intermediate region in the axis direction, and the gear teeth are formed in two regions provided adjacent to the intermediate region so as to sandwich the intermediate region therebetween in the axis directions.

The gear teeth provided on the input shaft 148 and the gear teeth provided on the planet rollers 186 are engaged with each other, and the external thread provided on the input shaft 148 and the external threads provided on the planet rollers 186 are threadedly engaged with each other. Meanwhile, the gear teeth provided on the planet rollers 186 and the gear teeth provided on the output cylinder 154 are engaged with each other, and the external threads provided on the planet rollers 186 and the internal thread provided on the output cylinder 154 are threadedly engaged with each other. The external thread of the input shaft 148, the external threads of the planet rollers 186, and the internal thread of the output cylinder 154 have the same pitch.

In the motion conversion mechanism 150, a ratio between the number of threads of the external thread of the input shaft 148, the number of threads of the external thread of each of the four planet rollers 186, and the number of threads of the internal thread of the output cylinder 154, and a ratio between the number of teeth of the gear teeth of the input shaft 148, the number of teeth of the gear teeth of each of the four planet rollers 186, and the number of teeth of the gear teeth of the output cylinder 154 are set to respective ratios that do not allow the output cylinder 154 and the four planet rollers 186 to relatively move in the axis direction, but allow the input shaft 148 and the four planet rollers 186 to relatively move in the axis direction, at the time when the input shaft 148 is rotated. Accordingly, when the input shaft 148 is rotated by the electric motor 144, the four planet rollers 186 move together with the output cylinder 154.

An operating principle, an action, and the like of the motion conversion mechanism 150 by the basic structure of the motion conversion mechanism 150 as described above have been publicly known, and are described in detail in Japanese Patent Application Publication No. 2007-56952 (JP 2007-56952 A), for example. Accordingly, the descriptions about the operating principle, the action, and the like are omitted here.

The actuator 110 is provided with a piston retreat prohibition mechanism 190 for prohibiting retreat of the piston 142 in a state where the piston 142 advances, so as to demonstrate a function as an electric parking brake.

Referring to FIGS. 6A and 6B illustrating sections perpendicular to the axis direction, the flange 170 rotates by the rotation of the input shaft 148, so that the flange 170 functions as an interlocking body that rotates in conjunction with advance and retreat of the piston 142. Ratchet teeth 192 are formed on an outer periphery of the flange 170. In the meantime, a solenoid 196 as an electromagnetic actuator is fixed to the housing 140 of the actuator 110 via a floor board 194, and a locking rod 198 is moved in its axis direction by the solenoid 196. A guide sleeve 200 is attached to the floor board 194, so that the locking rod 198 is guided by the guide sleeve 200 so as to advance and retreat. Incidentally, a notch 202 is formed in the housing 140 of the actuator 110, so that the guide sleeve 200 is provided inside the notch 202, and a tip end of the locking rod 198 enters the housing 140 in an opposed manner.

A lug 204 is formed in the tip end of the locking rod 198 as an engaging member, and the lug 204 is engageable with the ratchet teeth 192 of the flange 170. FIGS. 5, 6A illustrate a state where the locking rod 198 is placed at a position where the lug 204 is not engageable with the ratchet teeth 192, and FIG. 6B illustrates a state where the locking rod 198 is placed at a position where the lug 204 is engageable with the ratchet teeth 192. That is, the solenoid 196 constitutes an engaging member moving device 206 configured to move the locking rod 198 as the engaging member between those positions. Briefly speaking, a state where the locking rod 198 advances is a state where the locking rod 198 locks the flange 170 as the interlocking body, and a state where the locking rod 198 retreats is a state where the locking rod 198 does not lock the flange 170.

As understood from directions of the ratchet teeth 192 and the lug 204 of the locking rod 198, in a state where the lug 204 is engaged with the ratchet teeth 192, a rotation of the flange 170 in a direction (a direction of a black arrow illustrated in the figure and referred to as a "reverse rotation direction" occasionally) where the piston 142 retreats is prohibited, but a rotation of the flange 170 in a direction (a direction of a white arrow illustrated in the figure and referred to as a "forward rotation direction" occasionally) where the piston 142 advances is permitted. In short, a one-way clutch mechanism 208 is constituted by the ratchet teeth 192 and the lug 204, and the piston retreat prohibition mechanism 190 for prohibiting retreat of the piston 142 is constituted by the one-way clutch mechanism 208, the flange 170 on which the ratchet teeth 192 is formed, the locking rod 198 having the tip end provided with the lug 204, the solenoid 196, and the like.

In a case where a parking brake is applied, an electric current is applied to the solenoid 196 so as to advance the locking rod 198, and in a state where the piston 142 is advanced by the electric motor 144 until a necessary braking force is obtained, the current application to the solenoid 196 is stopped. Even if the current application to the solenoid 196 is stopped, the state where the locking rod 198 is advanced is maintained due to the action by the shapes of the ratchet teeth 192 and the lug 204. In the meantime, in a case where the parking brake is released, the piston 142 is further advanced by the electric motor 144. Hereby, the engagement between the lug 204 and the ratchet teeth 192 is released and the locking rod 198 retreats due to a restoring force of the solenoid 196. In that state, the piston 142 retreats due to the electric motor 144, so that the parking brake is released.

Based on the foregoing, the engaging member moving device 206 including the solenoid 196 is configured such that, due to supply of an electric power from outside, that is, supply of an energy from outside, the locking rod 198 as the engaging member is moved from a position where the locking rod 198 is not engageable with the flange 170 as the interlocking body to a position where the locking rod 198 is engageable therewith, and when the supply of the energy is stopped, the locking rod 198 returns to the position where the locking rod 198 is not engageable with the flange 170. Accordingly, the piston retreat prohibition mechanism 190 is a mechanism configured such that, when the retreat of the piston 142 is prohibited once, a state where the retreat of the piston is prohibited is maintained even if the supply of the energy is stopped, which is excellent in the viewpoint of energy saving.

In addition to the constituents described above, the actuator 110 is provided with a resolver 210 as a motor rotation angle sensor for detecting a rotation angle of the electric motor 144. Based on a detection signal of the resolver 210, it is possible to detect a position of the piston 142 in the axis direction and a moving amount thereof. Further, an electric braking force generated by the electric braking device 100 depends on a pressing force of the brake friction pads 124a, 124b with respect to the disc rotor 122 by the piston 142, and therefore, in the actuator 110, a pressing force sensor 212 for detecting the pressing force is provided between the thrust bearing 172 and the seat 176.

As illustrated in FIG. 1, a current is supplied to the electric motor 144 of the electric braking device 100 and the solenoid 196 from an auxiliary battery 214, which is a battery different from the battery 28, that is, the battery 28 included in the vehicle drive system. Note that the current may be supplied thereto not from the auxiliary battery 214, but from the battery 28.

[E] Control of Vehicle Braking System i) Control System

A control of the vehicle braking system, that is, a control of a braking force F is performed by a control system illustrated in FIG. 1. More specifically, a control of the hydraulic braking device 32 is performed by a hydraulic braking device electronic control unit (hereinafter abbreviated as "HY-ECU" occasionally) 230, and a control of the electric braking device 34 is performed by two electric braking electronic control units (hereinafter abbreviated as "EM-ECU" occasionally) 232 provided for respective electric braking devices 100. The HY-ECU 230 is constituted by a computer, drivers (drive circuits) for respective devices constituting the hydraulic braking device 32, and the like, and the EM-ECU 232 is constituted by a computer, drivers (drive circuits) for respective devices constituting the electric braking device 100, and the like. A control of the regenerative braking device 30 is performed by a hybrid electronic control unit (hereinafter abbreviated as "HB-ECU" occasionally) 234.

More specifically, the HB-ECU 234 performs controls of the inverters 26G, 26M constituting the regenerative braking device 30, the HY-ECU 230 performs controls of the control retaining valve 64 and the like of the actuator unit 44 constituting the hydraulic braking device 32, and the EM-ECU 232 performs controls of the electric motor 144 and the solenoid 196 of each of the electric braking devices 100 constituting the electric braking device 34, so that a regenerative braking force $F_{RG}$, a hydraulic braking force $F_{HY}$, and an electric braking force $F_{EM}$ are controlled. Accordingly, a whole braking force $F_{SUM}$, which is a braking force F given to the whole vehicle, is controlled.

In the vehicle braking system, the HB-ECU 234, the HY-ECU 230, and the EM-ECU 232 as control devices are connected to each other in the network (CAN) in the vehicle, and perform respective controls while communicating with each other. As described below, the HY-ECU 230 functions as a main electronic control unit that generally controls the HB-ECU 234 and the EM-ECU232 in the vehicle braking system. Note that it can be considered that one control device is constituted by the HB-ECU 234, the HY-ECU 230, and the EM-ECU 232. Actually, the regenerative braking device 30, the hydraulic braking device 32, and the electric braking device 34 can be controlled by one electronic control unit.

ii) Summary of Basic Control

In a basic control of the vehicle braking system, a request whole braking force $F_{SUM}*$, which is a braking force F (a sum of braking forces F given to four wheels 10) requested to the whole vehicle, is determined based on an operation of the brake pedal 40. More specifically, as illustrated in FIGS. 1, 2, the brake pedal 40 is provided with an operation force sensor 236 for detecting an operation force δ of the brake pedal 40, and the HY-ECU 230 finds the request whole braking force $F_{SUM}*$ by multiplying the operation force δ detected by the operation force sensor 236 by a braking force coefficient $α_F$. Incidentally, the operation force δ is a kind of an operation value indicating a degree of an operation of the brake pedal 40, that is, a degree of a brakes operation, and can be regarded as a parameter indicating the request whole braking force $F_{SUM}*$. Note that various parameters can be employed as the parameter. For example, the request whole braking force $F_{SUM}*$ may be determined by employing an operation amount of the brake pedal 40, or by employing both the operation amount and the operation force δ.

Briefly speaking, in the control of the braking force of the vehicle braking system, the regenerative braking force $F_{RG}$ is generated preferentially, and an insufficient braking force $F_{IS}$ in the request whole braking force $F_{SUM}*$ is covered by the hydraulic braking force $F_{HY}$ and the electric braking force $F_{EM}$. The insufficient braking force $F_{IS}$ is a shortage that cannot be covered by the regenerative braking force $F_{RG}$. Incidentally, each of the regenerative braking force $F_{RG}$, the hydraulic braking force $F_{HY}$, and the electric braking force $F_{EM}$ is a sum of braking forces F given to two wheels 10 (i.e., the front wheels 10F or the rear wheels 10R) by a corresponding one of the regenerative braking device 30, the hydraulic braking device 32, and the electric braking device 34 (two electric braking devices 100). In practice, a half of the regenerative braking force $F_{RG}$, the hydraulic braking force $F_{HY}$, or the electric braking force $F_{EM}$ is given to each of two front wheels 10F or rear wheels 10R. However, for simplification, in the following description, two front wheels 10F and two rear wheels 10R are regarded as one virtual front wheel 10F and one virtual rear wheel 10R, respectively, and it is assumed that each of the regenerative braking force $F_{RG}$, the hydraulic braking force $F_{HY}$, and the electric braking force $F_{EM}$ is given to a corresponding one of the one front wheel 10F and the one rear wheel 10R.

A control of the braking force F will be described specifically. First, a maximum regenerative braking force $F_{RG\text{-}MAX}$, which is a regenerative braking force $F_{RG}$ generatable at that point, is specified according to a charged state of the battery 28, a vehicle running speed $v_B$, and the like. When the request whole braking force $F_{SUM}*$ is the maximum regenerative braking force $F_{RG\text{-}MAX}$ or less, the request whole braking force $F_{SUM}*$ is determined as a request regenerative braking force $F_{RG}*$, which is a regenerative braking force $F_{RG}$ to be requested. When the request whole braking force $F_{SUM}*$ is larger than the maximum regenerative braking force $F_{RG\text{-}MAX}$, the maximum request regenerative braking force $F_{RG\text{-}MAX}$ is determined as the request regenerative braking force $F_{RG}*$. Incidentally, the vehicle running speed $v_B$ is found based on a wheel rotation speed $v_W$ of the wheel 10F, 10R, detected by a wheel speed sensor 238 (see FIG. 1) provided for the wheel 10F, 10R.

Subsequently, the insufficient braking force $F_{IS}$ is determined by subtracting the request regenerative braking force $F_{RG}*$ from the request whole braking force $F_{SUM}*$. The insufficient braking force $F_{IS}$ is multiplied by a hydraulic braking force distribution coefficient $\beta_{HY}$ and an electric braking force distribution coefficient $\beta_{EM}$ ($\beta_{HY}+\beta_{EM}=1$), respectively, so as to determine a request hydraulic braking force $F_{HY}*$ and a request electric braking force $F_{EM}*$, respectively. The hydraulic braking force distribution coefficient $\beta_{HY}$ and the electric braking force distribution coefficient $\beta_{EM}$ are respective distribution coefficients of a hydraulic braking force $F_{HY}$ and an electric braking force $F_{EM}$ with respect to the front wheel 10F and the rear wheel 10R. The request hydraulic braking force $F_{HY}*$ and the request electric braking force $F_{EM}*$ are a hydraulic braking force $F_{HY}$ to be generated and an electric braking force $F_{EM}$ to be generated, respectively. That is, the insufficient braking force $F_{IS}$ is distributed into the request hydraulic braking force $F_{HY}*$ and the request electric braking force $F_{EM}*$ according to a setting distribution ($\beta_{HY}:\beta_{EM}$).

The regenerative braking device 30, the hydraulic braking device 32, and the electric braking device 34 are controlled respectively based on the request regenerative braking force $F_{RG}*$, the request hydraulic braking force $F_{HY}*$, and the request electric braking force $F_{EM}*$ determined as described above, so that a whole braking force $F_{SUM}$ based on the request whole braking force $F_{SUM}*$ is given to the vehicle. Note that the control of the braking force described herein is referred to as a "normal control."

iii) Electric Braking Force Maintaining Control

As described above, the electric braking device 34 has a parking brake function, and in order to realize the function, the electric braking device 34 includes the piston retreat prohibition mechanism 190. In the vehicle braking system, the electric braking device 34 is controlled so that a control to generate a predetermined electric braking force $F_{EM}$ is executed by use of the piston retreat prohibition mechanism 190 without performing current application to the electric motor 144. In other words, an electric braking force maintaining control, which is a control to maintain an electric braking force $F_{EM}$ generated by the electric braking device 34 as a maintaining electric braking force $F_{EM\text{-}MEN}$, is executed. Note that the maintaining electric braking force $F_{EM\text{-}MEN}$ is not a braking force F generated by the current application to the electric motor 144, but is a braking force F generated by the electric braking device 34. Accordingly, this braking force F is also dealt as the electric braking force $F_{EM}$.

The electric braking force maintaining control is started at the time when a setting start condition, which is a start condition that has been set, is satisfied. As understood from the structure of the electric brake actuator 110, when the piston retreat prohibition mechanism 190 is operated, that is, the locking rod 198 is advanced to be engaged with the flange 170, and the current application to the electric motor 144 is stopped, an electric braking force $F_{EM}$ generated at that point is maintained as the maintaining electric braking force $F_{EM\text{-}MEN}$.

During a vehicle running, when a change of the request electric braking force $F_{EM}*$ is decreased to some extent, in other words, when the brakes operation is considered stable, the setting start condition is determined to be satisfied, so that the electric braking force maintaining control is started. More specifically, when a request electric braking force slope $\Delta F_{EM}*$, which is a change slope of the request electric braking force $F_{EM}*$, becomes smaller than a setting threshold, that is, a setting threshold slope $\Delta F_{EM}*_{\text{-}TH}$, the electric braking force maintaining control is started. In order to deal with some fluctuation of the insufficient braking force $F_{IS}$ while the electric braking force maintaining control is executed during the vehicle running, the request hydraulic braking force $F_{HY}*$ is corrected based on an electric braking force difference $dF_{EM}$, which is a difference between the request electric braking force $F_{EM}*$ and the maintaining electric braking force $F_{EM\text{-}MEN}$. More specifically, such a correction is performed that a value obtained by subtracting the maintaining electric braking force $F_{EM\text{-}MEN}$ from the request electric braking force $F_{EM}*$ is added to the request hydraulic braking force $F_{HY}*$.

In the meantime, in a state where the vehicle stops, a generated electric braking force $F_{EM}$ exceeds or is over a vehicle hold achievable electric braking force $F_{EM\text{-}HOLD}$, which is a braking force F requested to hold the vehicle stopped, the setting start condition is determined to be satisfied, so that the electric braking force maintaining control is started. That is, due to the electric braking force maintaining control, the maintaining electric braking force $F_{EM\text{-}MEN}$ is set to an electric braking force $F_{EM}$ generally equal to the vehicle hold achievable electric braking force $F_{EM\text{-}HOLD}$. When the electric braking force maintaining control is performed during the vehicle stop, the hydraulic braking force $F_{HY}$ is also maintained at a maintaining hydraulic braking force $F_{HY\text{-}MEN}$, which is a hydraulic braking force $F_{HY}$ at the time when the electric braking force maintaining control is started. Accordingly, the vehicle hold achievable electric braking force $F_{EM\text{-}HOLD}$ is set as a quota of the electric braking force $F_{EM}$ by the electric braking device 34. That is, when the hydraulic braking force $F_{HY}$ to be maintained is assumed a vehicle hold achievable hydraulic braking force $F_{HY\text{-}HOLD}$, the vehicle hold achievable hydraulic braking force $F_{HY\text{-}HOLD}$ and the vehicle hold achievable electric braking force $F_{EM\text{-}HOLD}$ are set so that a sum of the vehicle hold achievable hydraulic braking force $F_{HY\text{-}HOLD}$ and the vehicle hold achievable electric braking force $F_{EM\text{-}HOLD}$ can provide a braking force F that can hold the vehicle stopped. Incidentally, when the vehicle stops, the regenerative braking force $F_{RG}$ is not generated, and a ratio between the vehicle hold achievable hydraulic braking force $F_{HY\text{-}HOLD}$ and the vehicle hold achievable electric braking force $F_{EM\text{-}HOLD}$ follows the distribution ratio ($\beta_{HY}:\beta_{EM}$).

When the request electric braking force $F_{EM}^*$ or its change exceeds a setting maintenance limit, the execution of the electric braking force maintaining control is stopped, and the normal control is restored. As understood from the structure of the piston retreat prohibition mechanism 190, when an electric current is applied to the electric motor 144 so as to rotate the flange 170 in a direction to advance the piston 142, that is, in the forward rotation direction, the locking of the piston 142 is released, which permits retreat of the piston 142. Hereby, the normal control can be started.

More specifically, when the request electric braking force $F_{EM}^*$ falls below or is expected to fall below the maintaining electric braking force $F_{EM\text{-}MEN}$ during the execution of the electric braking force maintaining control, it is determined that the setting maintenance limit is exceeded, so that the normal control is restored. In the vehicle braking system, in consideration for delay of the restoration to the normal control, specifically, when the request electric braking force $F_{EM}^*$ decreases and becomes lower than a value obtained by adding some margin force $F_{EM\text{-}MAR}$ to the maintaining electric braking force $F_{EM\text{-}MEN}$, it is estimated that the request electric braking force $F_{EM}^*$ would fall below the maintaining electric braking force $F_{EM\text{-}MEN}$, and the normal control is restored. That is, the normal control is restored based on a driver's intention to weaken or stop the brakes operation, and the maintaining electric braking force $F_{EM\text{-}MEN}$ is released without delay with respect to a subsequent accelerator operation, for example. Note that, in a case where the request electric braking force $F_{EM}^*$ is held within the margin force $F_{EM\text{-}MAR}$, a condition that the request electric braking force $F_{EM}^*$ decreases is set as an incidental condition of the restoration to the normal control in consideration that the start of the electric braking force maintaining control and the restoration to the normal control are repeated. On this account, as a condition of the restoration to the normal control from a case where the request electric braking force $F_{EM}^*$ is held within the margin force $F_{EM\text{-}MAR}$, the normal control is also restored in a case where the request electric braking force $F_{EM}^*$ falls below the maintaining electric braking force $F_{EM\text{-}MEN}$. The restoration to the normal control described herein is performed both in a case where the electric braking force maintaining control is started during the vehicle running and in a case where the electric braking force maintaining control is started during the vehicle stop.

Further, in a case where the request electric braking force $F_{EM}^*$ increases to some extent with respect to the maintaining electric braking force $F_{EM\text{-}MEN}$ during the execution of the electric braking force maintaining control, it is also determined that the setting maintenance limit is exceeded, so that the normal control is restored. More specifically, a value obtained by adding an allowable increment $\delta F_{EM}^*$ (set as a value larger than the margin force $F_{EM\text{-}MAR}$) of the request electric braking force $F_{EM}^*$ to the maintaining electric braking force $F_{EM\text{-}MEN}$ is set as an upper limit braking force $F_{EM}^*\text{-}_{LIM}$, and when the request electric braking force $F_{EM}^*$ exceeds the upper limit braking force $F_{EM}^*\text{-}_{LIM}$, it is determined that the setting maintenance limit is exceeded, so that the normal control is restored. This restoration is set, for example, in consideration that an increase of the request whole braking force $F_{SUM}^*$ cannot be followed only by the hydraulic braking force in a case where the driver performs the brakes operation relatively largely so as to obtain a relatively large braking force F during the vehicle running. Note that this restoration is performed not only in a case where the electric braking force maintaining control is started during the vehicle running, but also in a case where the electric braking force maintaining control is started during the vehicle stop.

Further, in the vehicle braking system, the execution of the electric braking force maintaining control is also stopped in a state where an anti-lock control is performed, although the request electric braking force $F_{EM}^*$ or its change does not exceed the setting maintenance limit. Since the anti-lock control is a well-known technique, the description thereof is made briefly. In the vehicle braking system, in a case where the rotation of the wheel 10F or 10R is locked by slip, the control retaining valve 64 is controlled for the hydraulic braking device 32 and the current application to the electric motor 144 is controlled for the electric braking device 34, so as to release the lock of the wheel 10F, 10R. More specifically, when a wheel rotation speed difference $\delta v_W$ exceeds a threshold difference $\delta v_{W0}$ to start the anti-lock control, the anti-lock control is started. The wheel rotation speed difference $\delta v_W$ is a difference between an estimated wheel rotation speed $v_W'$ of a given wheel 10F, 10R and an actual wheel rotation speed $v_W$ of the given wheel 10F, 10R. The estimated wheel rotation speed $v_W'$ of the given wheel 10F, 10R is estimated based on a vehicle running speed $v_B$ found from wheel rotation speeds $v_w$ of four wheels 10F, 10R. However, when the wheel rotation speed difference $\delta v_W$ exceeds a threshold difference $\delta v_{W0}'$ set smaller than the threshold difference $\delta v_{W0}$, the normal control is restored. The electric braking force maintaining control is stopped by such a determination before the anti-lock control is started, so that the anti-lock control is not affected by the electric braking force maintaining control.

iv) Parking Control

A parking control is a control to be performed when the operation of the vehicle is stopped, and is a control to functionalize the electric braking device 34 as a parking brake. When the driver operates a so-called parking switch, an electric current is applied to the electric motor 144 until a predetermined electric braking force $F_{EM}$ is provided. At a time point when the predetermined electric braking force $F_{EM}$ is provided, the piston retreat prohibition mechanism 190 is operated. When the driver operates the parking switch again, the piston 142 is slightly advanced, and then, the prohibition of the retreat of the piston 142 by the piston retreat prohibition mechanism 190 is released. Since the parking control is common, further descriptions thereof are omitted.

v) Control Flow

In the vehicle braking system, the HY-ECU 230, the EM-ECU 232, and the HB-ECU 234 communicate with each other and execute respective control programs, so as to control the braking force F in cooperation. If respective executions of respective programs of the ECU 230, 232, 234 are described, the description becomes complicated. On this account, the following describes a control flow on the premise that the HY-ECU 230, the EM-ECU 232, and the HB-ECU 234 constitute one control device, and the control device executes some control programs.

The control device roughly executes two control programs. Briefly speaking, one of them is a braking force control program to execute controls on magnitudes of braking forces $F_{RG}$, $F_{HY}$, $F_{EM}$ to be generated by respective braking devices 30, 32, 34, and the other one of them is a control switching program related to switching between the normal control and the electric braking force maintaining control. Respective control flows of those two programs, that is, flows of respective processes according to those two programs will be described in turn. Note that the parking control is a control to functionalize respective electric braking devices 100 as the parking brake, and is a common control. On this account, a control flow thereof is omitted in the following description.

v-a) Control Switching Program

Figure 7A:
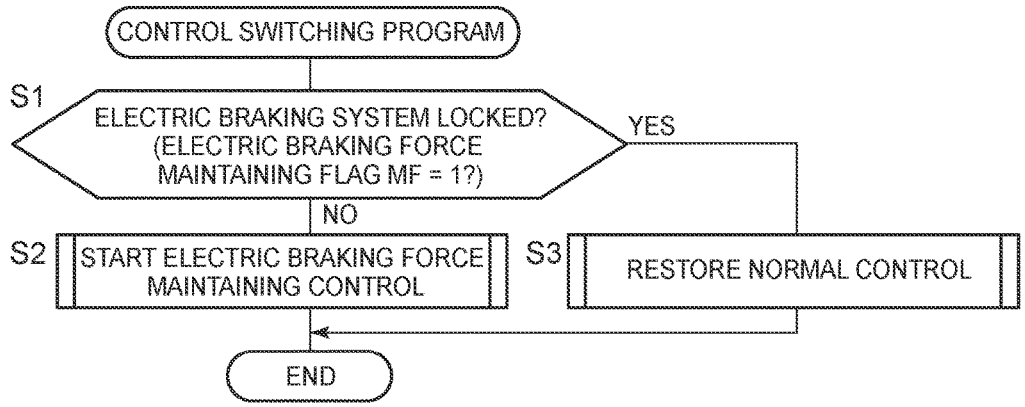
FIG. 7A is a flowchart to describe a control switching program executed in the vehicle braking system in FIG. 1.

A control switching program as illustrated in the flowchart of FIG. 7A is repeatedly executed at a short time pitch (e.g., one to a few msec) mainly by the EM-ECU 232. In a process in accordance with the control switching program, first, in step 1 (hereinafter abbreviated as "S1," the same shall apply to other steps), it is determined whether the electric braking device 100 is in a locked state or not. The locked state as used herein indicates a state where the locking rod 198 of the piston retreat prohibition mechanism 190 is engaged with the flange 170 and the piston 142 is locked so that its retreat is prohibited. Incidentally, an operation of the piston retreat prohibition mechanism 190 to realize that state is referred to as a locking operation. On the other hand, a state where the piston 142 is not locked is referred to as an unlocked state, and an operation to realize that state is referred to as an unlocking operation.

The recognition in S1 is performed based on a value of an electric braking force maintaining flag MF (describe later). When the locked state is established, the flag MF is set to "1," and when the unlocked state is established, the flag MF is set to "0." When the electric braking device 100 is not in the locked state, that is, when it is recognized that the electric braking device 100 is in the unlocked state, an electric braking force maintaining control start subroutine in S2 is executed. When it is recognized that the electric braking device 100 is in the locked state, a normal control restore subroutine in S3 is executed.

Figure 7B:
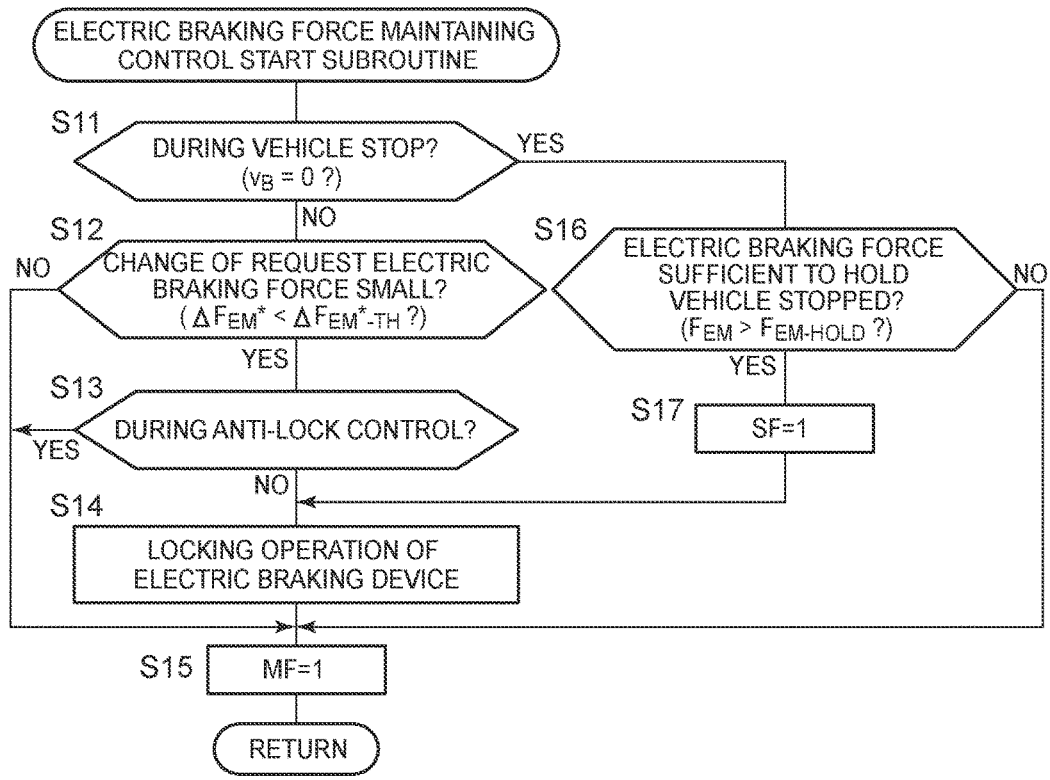
FIG. 7B is a flowchart illustrating an electric braking force maintaining control start subroutine executed in the program illustrated in FIG. 7A.

In a process in accordance with the electric braking force maintaining control start subroutine illustrated in FIG. 7B, first, in S11, it is recognized whether the vehicle stops or not depending on whether a vehicle running speed $v_B$ estimated based on respective wheel rotation speeds $v_W$ of the wheels 10F, 10R, detected by the wheel speed sensors 238, is zero or not. When the vehicle does not stop, that is, when the vehicle runs, it is determined, in S12, whether or not a change of the request electric braking force $F_{EM}^*$ is small to some extent. More specifically, the determination is made based on whether the request electric braking force slope $\Delta F_{EM}^*$ is smaller than the setting threshold slope $\Delta F_{EM}^*{}_{-TH}$ or not. When it is determined that the change of the request electric braking force $F_{EM}^*$ is small to some extent, that is, when it is determined that a brakes operation by the brake pedal 40 is stable, it is determined, in S13, whether the anti-lock control is under execution or not. When the anti-lock control is not under execution, a locking operation of the electric braking device 100 is performed in S14. Then, in S15, a value of the electric braking force maintaining flag MF is set to "1," and here, the electric braking force maintaining control start subroutine is finished.

In the meantime, when it is determined, in S13, that the anti-lock control is under execution, or when it is determined, in S12, that the change of the request electric braking force $F_{EM}^*$ is large (e.g., the brakes operation is being performed, and the like), the subroutine is finished.

When it is recognized, in S11, that the vehicle stops, it is determined, in S16, whether or not an electric braking force $F_{EM}$ generated at present is sufficient to hold the vehicle stopped. More specifically, it is determined whether the electric braking force $F_{EM}$ exceeds the set vehicle hold achievable electric braking force $F_{EM\text{-}HOLD}$ or not. When the electric braking force is sufficient to hold the vehicle stopped, a vehicle-stop control flag SF is set to "1" in S17 and the locking operation is performed in S14. As understood from the description so far, the electric braking force maintaining control includes two controls, i.e., a control during a vehicle running and a control during a vehicle stop, and the vehicle-stop control flag SF is a flag which is set to "0" when the control during the vehicle running is performed and which is set to "1" when the control during the vehicle stop is performed. When it is determined, in S16, that the electric braking force $F_{EM}$ generated at present is not sufficient to hold the vehicle stopped, the subroutine is finished.

Figure 8:
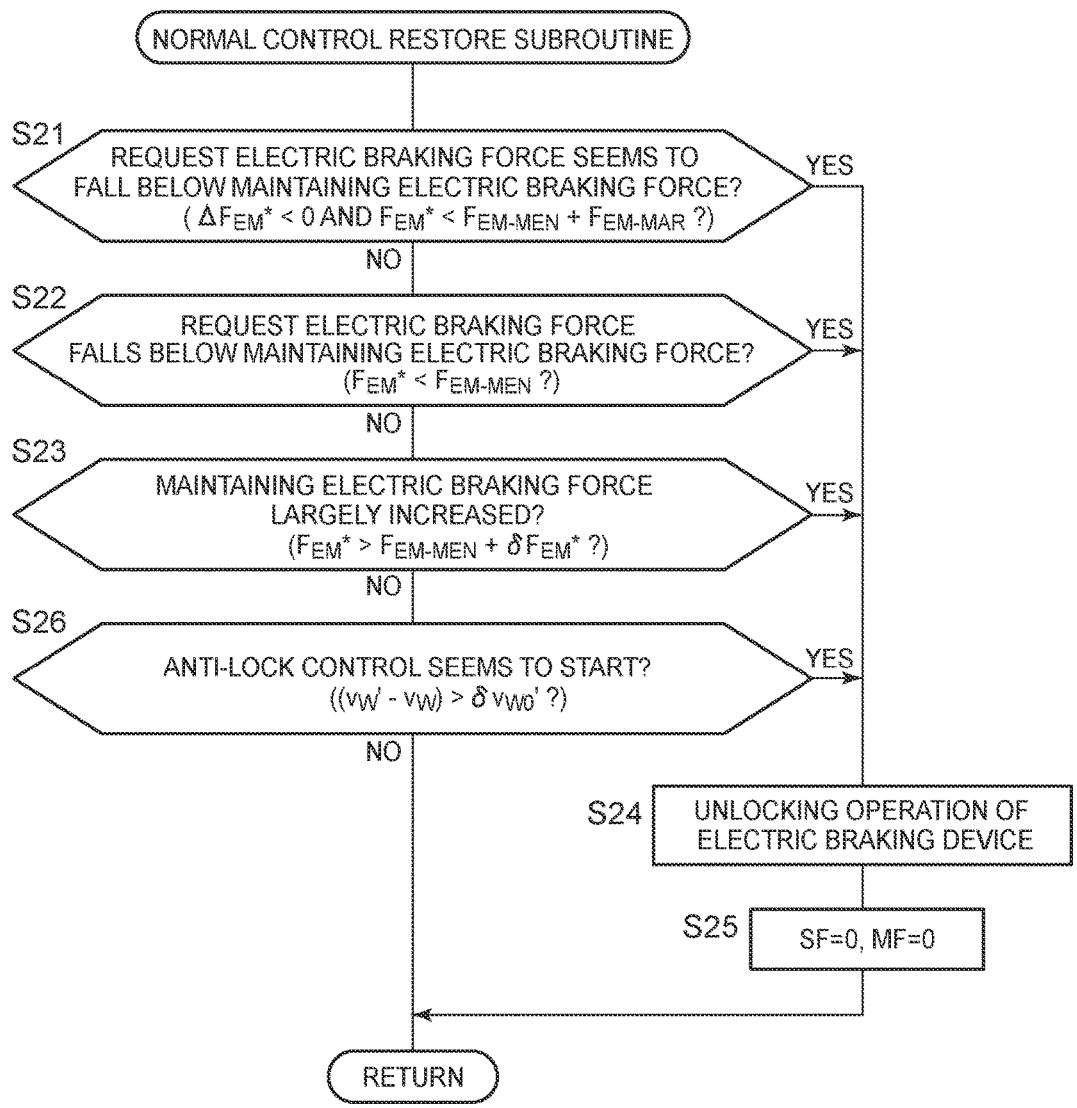
FIG. 8 is a flowchart illustrating a normal control restore subroutine executed in the control switching program illustrated in FIG. 7A.

In a process in accordance with the normal control restore subroutine as illustrated in the flowchart in FIG. 8, it is determined whether various conditions for restoration from the electric braking force maintaining control to the normal control are satisfied or not. In other words, it is determined whether a state that the request electric braking force $F_{EM}^*$ or its change exceeds a maintenance limit set for the electric braking force maintaining control is satisfied or not under various conditions. The meaning of the determination has been described earlier.

More specifically, in S21, it is determined whether or not the request electric braking force $F_{EM}^*$ seems to fall below the maintaining electric braking force $F_{EM\text{-}MEN}$, which is a fixed electric braking force $F_{EM}$ in the electric braking force maintaining control. More specifically, it is determined whether or not the request electric braking force slope $\Delta F_{EM}^*$ is smaller than 0 and the request electric braking force $F_{EM}^*$ is smaller than the value obtained by adding the margin force $F_{EM\text{-}MAR}$ to the maintaining electric braking force $F_{EM\text{-}MEN}$. Further, in S22, it is determined whether or not the request electric braking force $F_{EM}^*$ actually falls below the maintaining electric braking force $F_{EM\text{-}MEN}$. Further, in S23, it is determined whether or not the request electric braking force $F_{EM}^*$ increases to some extent with respect to the maintaining electric braking force $F_{EM\text{-}MEN}$. More specifically, the determination is made based on whether or not the request electric braking force $F_{EM}^*$ is larger than the value obtained by adding the allowable increment $\delta F_{EM}^*$ to the maintaining electric braking force $F_{EM\text{-}MEN}$. When any of the conditions in S21 to S23 is satisfied, it is determined that the request electric braking force $F_{EM}^*$ or its change exceeds the setting maintenance limit, so that the unlocking operation of the electric braking device 100 is performed in S24, and the vehicle-stop control flag SF and the electric braking force maintaining flag MF are reset to "0" in S25. Hereby, the subroutine is finished.

Separately from the determinations in S21 to S23 based on the request electric braking force $F_{EM}^*$ or its change, it is also determined, in S26, whether or not the anti-lock control seems to be started. More specifically, when the wheel rotation speed difference $\delta v_W$, which is a difference between the estimated wheel rotation speed $v_W'$ and the actual wheel rotation speed $v_W$, exceeds the threshold difference $\delta v_{W0}'$ set smaller than the threshold difference $\delta v_{W0}$ to start the anti-lock control, it is determined that the anti-lock control seems to be started, and the unlocking operation in S24 and the reset of the flags MF, SF in S25 are performed.

v-b) Braking Force Control Program

Figure 9:
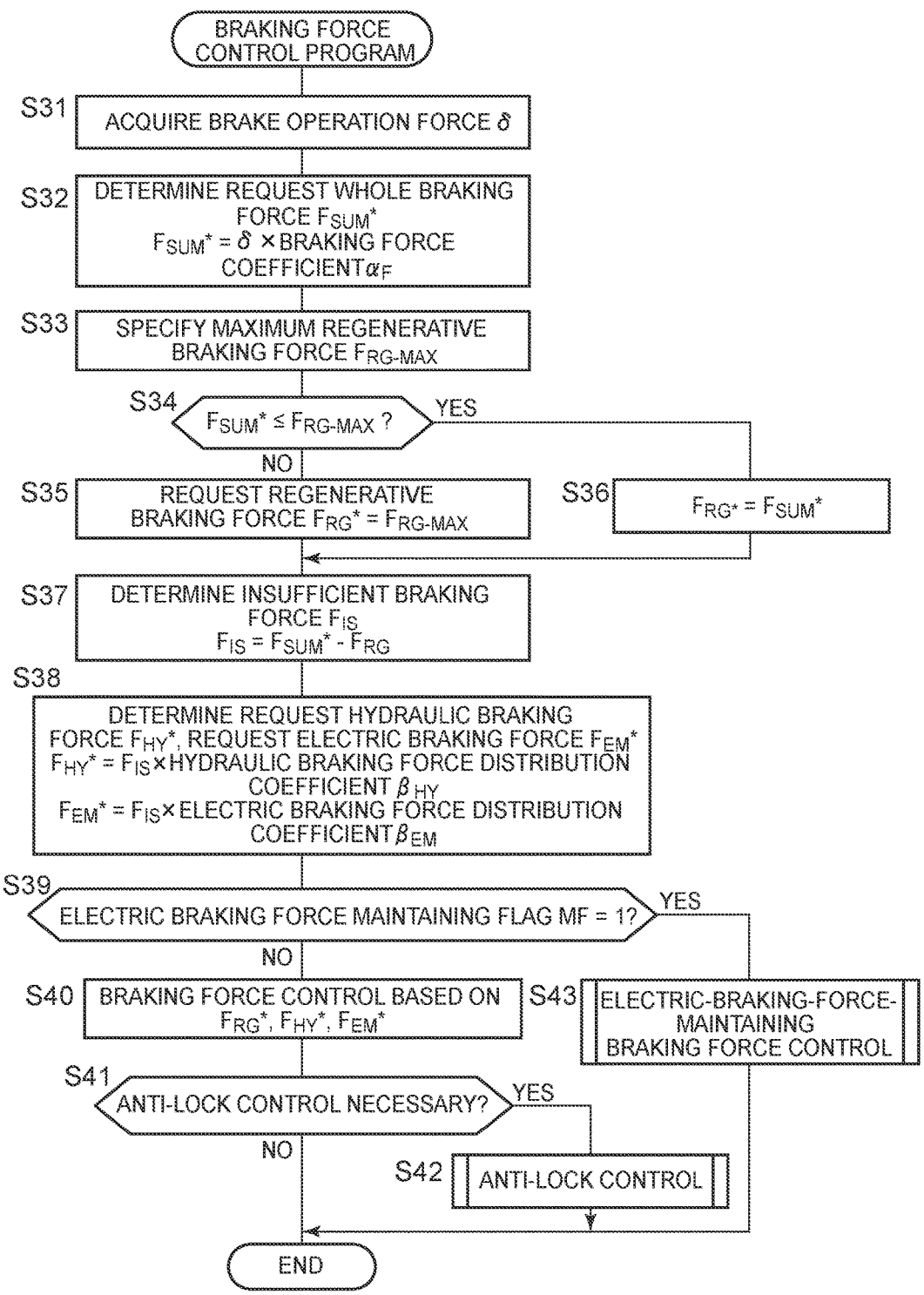
FIG. 9 is a flowchart to describe a braking force control program executed in the vehicle braking system in FIG. 1.

A braking force control program illustrated in the flowchart of FIG. 9 is a program to execute controls on magnitudes of the braking forces $F_{RG}$, $F_{HY}$, $F_{EM}$. In a process in accordance with the braking force control program, first, in S31, an operation force δ of the brake pedal 40, detected by the operation force sensor 236, is acquired, and in S32 subsequent thereto, a request whole braking force $F_{SUM}^*$, which is a braking force F requested to the whole vehicle, is determined based on the operation force δ. This determination is performed by multiplying the operation force δ by a braking force coefficient $\alpha_F$.

Subsequently, in S33, a maximum regenerative braking force $F_{RG-MAX}$, which is a maximum regenerative braking force $F_{RG}$ that can be generated at that point, is specified, and in S34, the request whole braking force $F_{SUM}^*$ thus determined is compared with the maximum regenerative braking force $F_{RG-MAX}$. When it is determined by the comparison that the request whole braking force $F_{SUM}^*$ is larger than the maximum regenerative braking force $F_{RG-MAX}$, the maximum regenerative braking force $F_{RG-MAX}$ is determined as the request regenerative braking force $F_{RG}^*$ in S35, in order to regenerate a possibly large energy. Meanwhile, when it is determined that the request whole braking force $F_{SUM}^*$ is the maximum regenerative braking force $F_{RG-MAX}$ or less, a whole braking force $F_{SUM}$ can be covered by a regenerative braking force $F_{RG}$, and therefore, in S36, the request whole braking force $F_{SUM}^*$ is determined as the request regenerative braking force $F_{RG}^*$.

Subsequently, in S37, the request regenerative braking force $F_{RG}^*$ is subtracted from the request whole braking force $F_{SUM}^*$, so that an insufficient braking force $F_{IS}$ is determined as a braking force F that cannot be covered by the regenerative braking force $F_{RG}$. Then, in S38, based on the insufficient braking force $F_{IS}$, a request hydraulic braking force $F_{HY}^*$ and a request electric braking force $F_{EM}^*$ are determined. More specifically, the request hydraulic braking force $F_{HY}^*$ and the request electric braking force $F_{EM}^*$ are found by multiplying the insufficient braking force $F_{IS}$ by the hydraulic braking force distribution coefficient $\beta_{HY}$ and the electric braking force distribution coefficient $\beta_{EM}$, respectively.

In S39, based on the electric braking force maintaining flag MF, it is determined whether the electric braking force maintaining control is performed or not. When the electric braking force maintaining control is not performed, the regenerative braking device 30, the hydraulic braking device 32, and the electric braking device 34 are controlled based on the request regenerative braking force $F_{RG}^*$, the request hydraulic braking force $F_{HY}^*$, and the request electric braking force $F_{EM}^*$, respectively, as the normal control in S40, so that a regenerative braking force $F_{RG}$, a hydraulic braking force $F_{HY}$, and an electric braking force $F_{EM}$ corresponding thereto are generated. Note that, in S41, it is determined whether the anti-lock control is necessary or not, and when the anti-lock control is necessary, an anti-lock control subroutine is executed in S42. Since the anti-lock control is a well-known control, the description of the anti-lock control subroutine is omitted.

Figure 10:
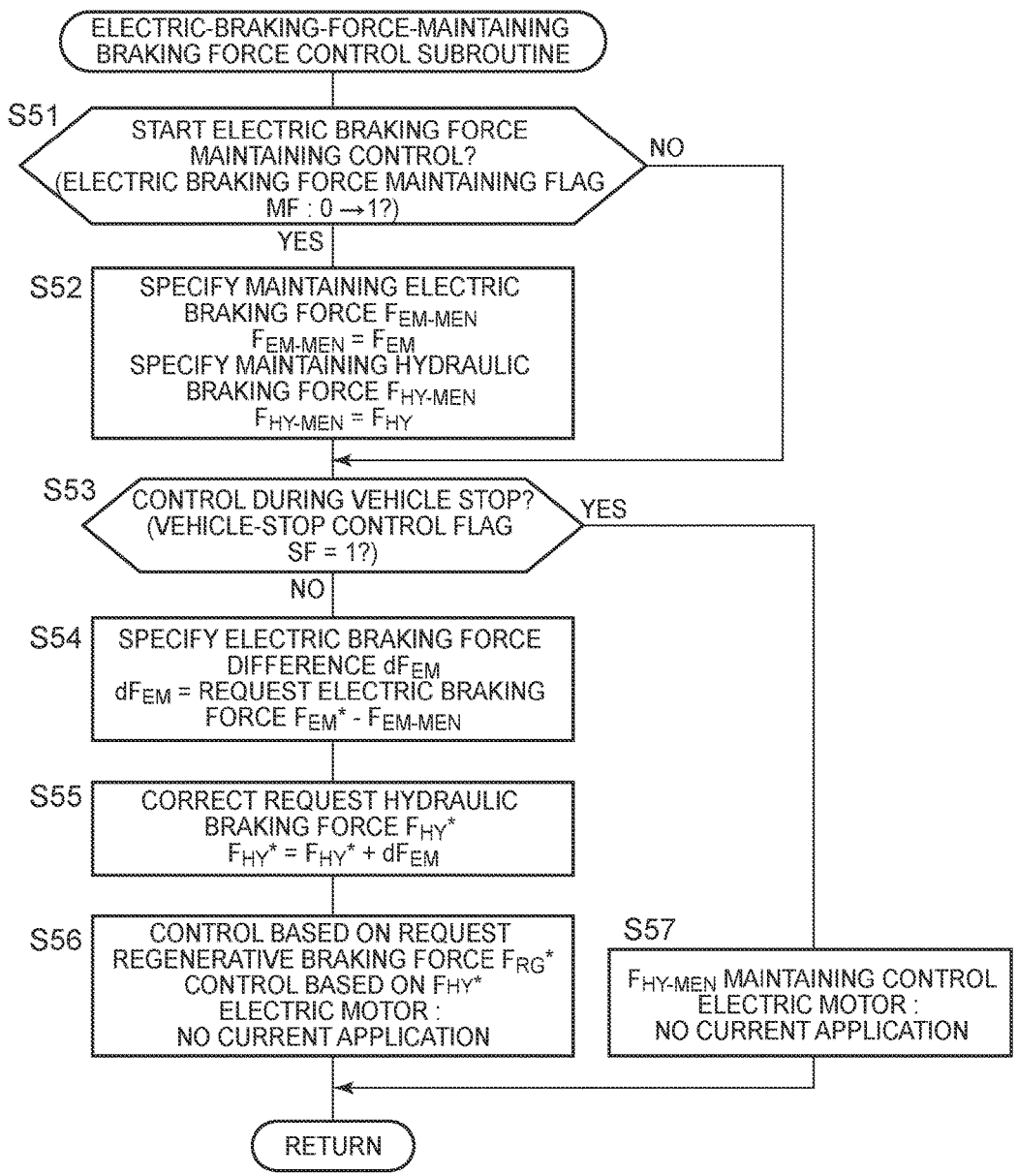
FIG. 10 is a flowchart illustrating an electric-braking-force-maintaining braking force control subroutine executed in the braking force control program illustrated in FIG. 9.

In the meantime, in S39, when it is determined whether the electric braking force maintaining control is executed, an electric-braking-force-maintaining braking force control subroutine illustrated in the flowchart in FIG. 10 is executed in S43.

In a process in accordance with the electric-braking-force-maintaining braking force control subroutine, first, in S51, it is determined whether or not the electric braking force maintaining control is started during the present execution of the braking force control program. When the electric braking force maintaining control is started this time, a maintaining electric braking force $F_{EM-MEN}$ and a maintaining hydraulic braking force $F_{HY-MEN}$ are determined as an electric braking force $F_{EM}$ and a hydraulic braking force $F_{HY}$ generated at present, in S52. Incidentally, the electric braking force $F_{EM}$ is acquired based on a detection value by the pressing force sensor 212 of the electric braking device 100, and the hydraulic braking force $F_{HY}$ is acquired based on a detection value by the wheel cylinder pressure sensor 74 included in the hydraulic braking device 32. When the electric braking force maintaining control has been started before the present execution of the braking force control program, S52 is skipped.

Then, in S53, based on a value of the vehicle-stop control flag SF, it is determined whether the electric braking force maintaining control is the electric braking force maintaining control during the vehicle running or the electric braking force maintaining control during the vehicle stop. In a case of the electric braking force maintaining control during the vehicle running, an electric braking force difference $dF_{EM}$, which is a difference between the request electric braking force $F_{EM}^*$ and the maintaining electric braking force $F_{EM-MEN}$, is specified in S54. Then, in S55, the request hydraulic braking force $F_{HY}^*$ is corrected based on the electric braking force difference $dF_{EM}$ thus specified, so as to compensate a shortage of the electric braking force $F_{EM}$ by the hydraulic braking force $F_{HY}$. Then, in S56, the regenerative braking device 30 is controlled based on the request regenerative braking force $F_{RG}^*$ that has been already determined, the hydraulic braking device 32 is controlled based on the corrected request hydraulic braking force $F_{HY}^*$, and current application to the electric motor 144 of the electric braking device 100 is stopped.

In the meantime, when it is determined, in S53, that the electric braking force maintaining control is the electric braking force maintaining control during the vehicle stop, the hydraulic braking device 32 is controlled to maintain the maintaining hydraulic braking force $F_{HY-MEN}$, and current application to the electric motor 144 of the electric braking device 100 is stopped, in S57. Incidentally, the vehicle is being stopped, so that the regenerative braking force is not generated.

vi) Changes of Hydraulic Braking Force and Electric Braking Force Under Execution of Electric Braking Force Maintaining Control The following describes changes over time in the hydraulic braking force $F_{HY}$ and the electric braking force $F_{EM}$ due to intervention of the electric braking force maintaining control with some situations being taken as examples.

vi-a) Change 1 During Vehicle Running

Figure 11A:
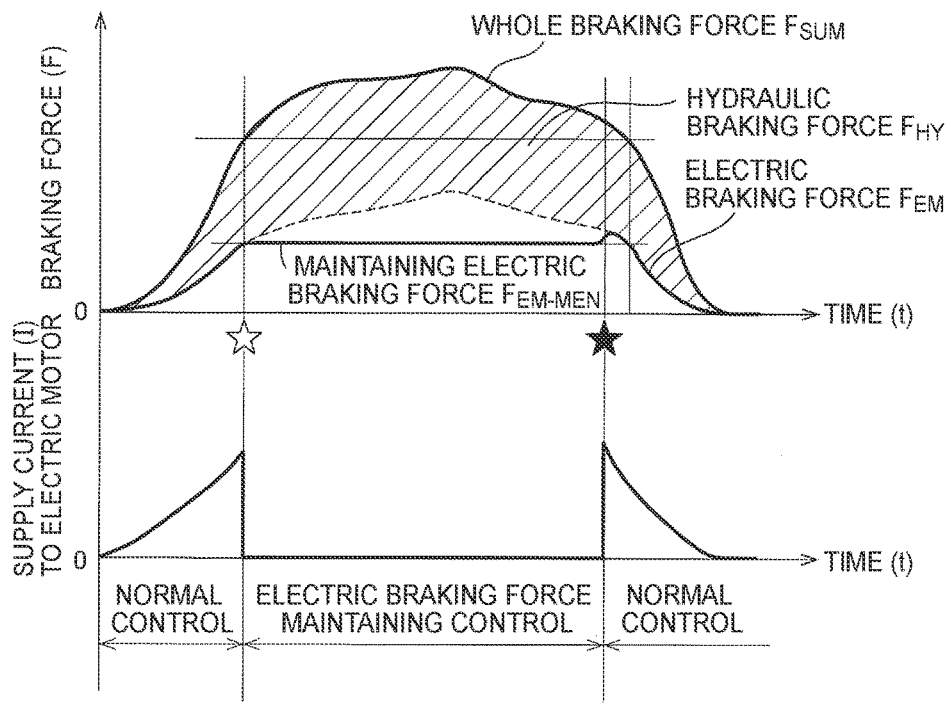
FIG. 11A is a graph illustrating a change state of a hydraulic braking force and an electric braking force by intervention of an electric braking force maintaining control.

In a case where the electric braking force maintaining control is intervened during the vehicle running, the hydraulic braking force $F_{HY}$ and the electric braking force $F_{EM}$ change as illustrated in FIG. 11A. More specifically, in a state where the brakes operation to obtain a whole braking force $F_{SUM}$ as illustrated in the figure is performed, when the brakes operation becomes stable to some extent, that is, when a change of the request electric braking force $F_{EM}^*$ is decreased to some extent (at a time point indicated by a white star in the figure), the electric braking force maintaining control is executed. During the execution, the electric braking force $F_{EM}$ is maintained at the maintaining electric braking force $F_{EM-MEN}$. Due to the progress of the brakes operation, the request electric braking force $F_{EM}^*$ continues changing as indicated by a broken line in the figure, so that the electric braking force becomes insufficient. In order to compensate the insufficient electric braking force, the hydraulic braking force $F_{HY}$ is generated. When the request electric braking force $F_{EM}^*$ is about to fall below the maintaining electric braking force $F_{EM\text{-}MEN}$ (at a time point indicated by a black start in the figure), the electric braking force maintaining control is finished.

While the electric braking force maintaining control is executed, the current application to the electric motor 144 of the electric braking device 100 is stopped as illustrated in the figure. Accordingly, the vehicle braking system is excellent in the viewpoint of power saving. Further, since the hydraulic braking force $F_{HY}$ compensates the shortage of the electric braking force $F_{EM}$, an appropriate whole braking force $F_{SUM}$ can be obtained while the electric braking force maintaining control is executed. Further, since the normal control is restored before the request electric braking force $F_{EM}^*$ falls below the maintaining electric braking force $F_{EM\text{-}MEN}$, a good response of the whole braking force $F_{sum}$ is secured.

vi-b) Change 2 During Vehicle Running

Figure 11B:
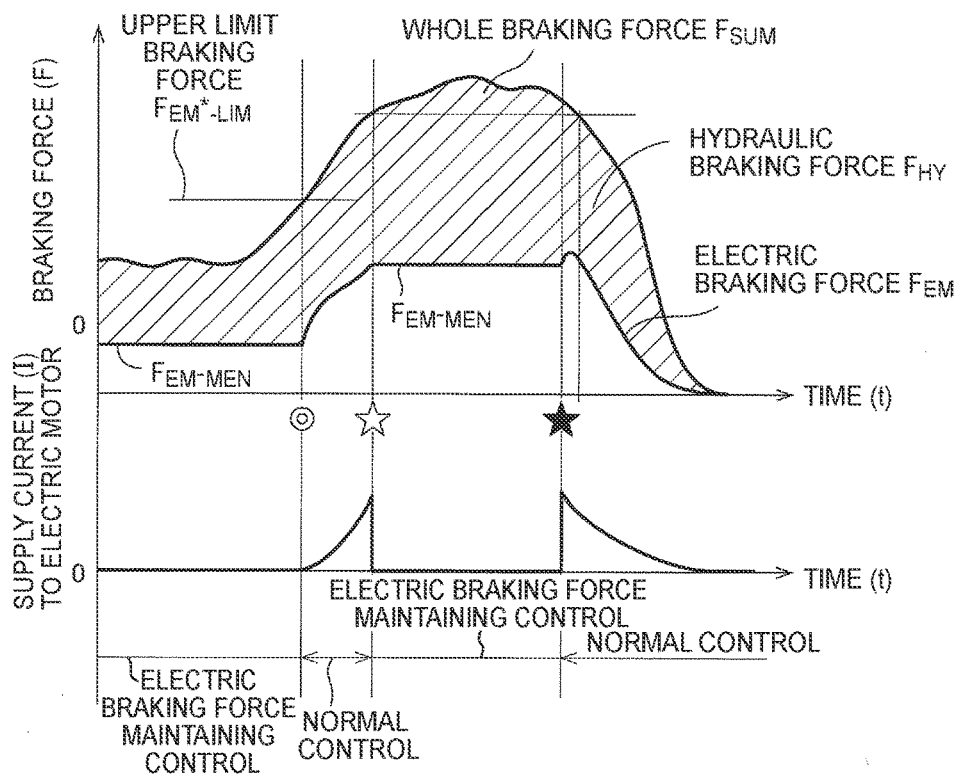
FIG. 11B is a graph illustrating a change state of a hydraulic braking force and an electric braking force by intervention of the electric braking force maintaining control, in a request whole braking force different from FIG. 11A.

As illustrated in FIG. 11B, when the brakes operation greatly progresses and a large whole braking force $F_{SUM}$ to some extent is required in the middle of the electric braking force maintaining control, that is, when the request electric braking force $F_{EM}^*$ exceeds the upper limit braking force $F_{EM}^*\text{-}_{LIM}$ (at a time point indicated by a double circle in the figure), the electric braking force maintaining control is canceled once and the normal control is restored. Hereby, the electric braking force increases in addition to the hydraulic braking force, which secures a sufficient whole braking force $F_{SUM}$.

vi-c) Change During Vehicle Stop

Figure 12A:
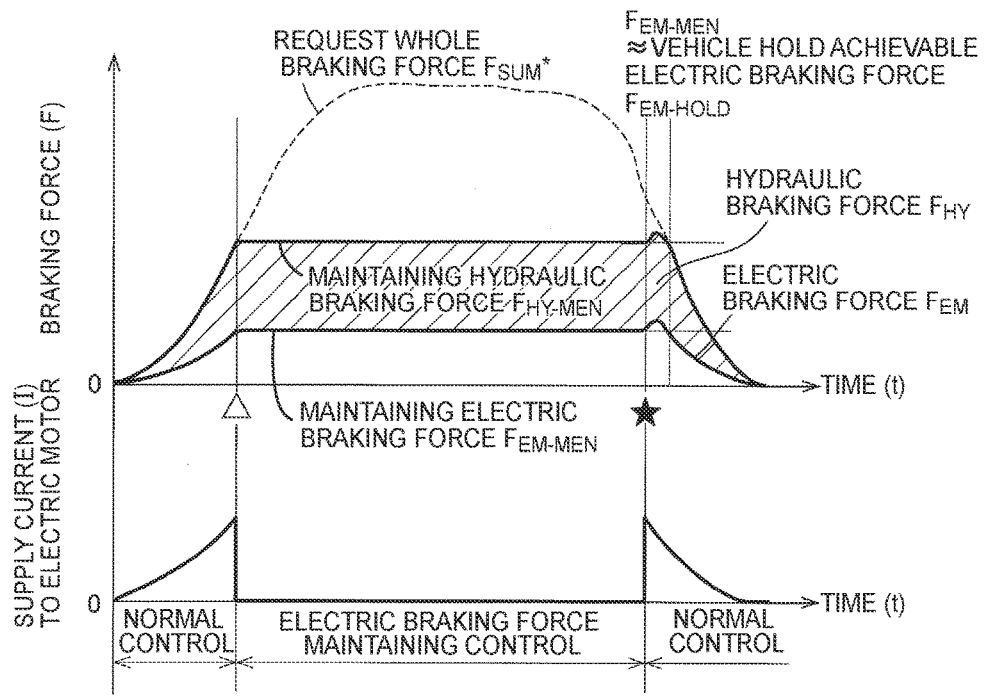
FIGS. 12A and 12B are graphs illustrating a change state of a hydraulic braking force and an electric braking force by intervention of the electric braking force maintaining control, in a situation different from situations of graphs in FIGS. 11A and 11B.

After the vehicle is stopped, a brakes operation to maintain the stop state is performed in some cases. In that case, as illustrated in FIG. 12A, when a generated electric braking force $F_{EM}$ exceeds the vehicle hold achievable electric braking force $F_{EM\text{-}HOLD}$, which is an electric braking force $F_{EM}$ requested to maintain the stop state of the vehicle, that is, when the whole braking force $F_{SUM}$ exceeds a braking force F that can maintain the stop state of the vehicle (at a time point indicated by a triangle in the figure), the electric braking force maintaining control is executed. In the electric braking force maintaining control in a state where the vehicle stops, the electric braking force $F_{EM}$ is maintained at the maintaining electric braking force $F_{EM\text{-}MEN}$, and in addition to that, the hydraulic braking force $F_{HY}$ is also maintained at the maintaining hydraulic braking force $F_{HY\text{-}MEN}$. Hereby, the hydraulic braking device 32 can also have a power-saving effect.

vi-d) Change by Change of Regenerative Braking Force

The description about the changes of the hydraulic braking force $F_{HY}$ and the electric braking force $F_{EM}$ so far has been made without the regenerative braking force $F_{RG}$, that is, on the premise that the regenerative braking force $F_{RG}$ is not generated, for simplification of description. The regenerative braking force $F_{RG}$ also exists during the vehicle running, and the regenerative braking force $F_{RG}$ not only depends on a brakes operation, but also changes due to other factors, more specifically, due to an amount of residual electricity of the battery 28, a vehicle running speed $v_B$, and the like. Although not illustrated herein, when the regenerative braking force $F_{RG}$ increases or decreases due to such other factors, the electric braking force $F_{EM}$ also changes so as to secure a requested whole braking force $F_{SUM}$. In a case where the regenerative braking force $F_{RG}$ changes and the request electric braking force $F_{EM}^*$ also changes during the electric braking force maintaining control, when the setting maintenance limit is exceeded, the normal control is restored. The vehicle brake system has such an action, so that the vehicle braking system is a preferred system to a vehicle also provided with the regenerative braking device.

vi-e) Change by Execution of Anti-Lock Control

Figure 12B:
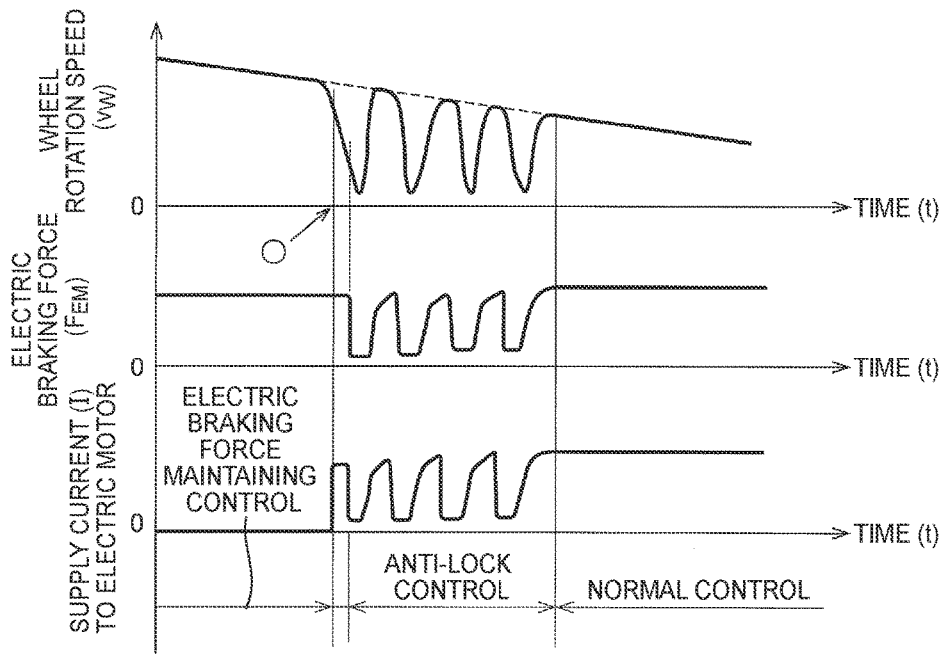

When the anti-lock control is performed during the execution of the electric braking force maintaining control, a sign of the anti-lock control is sensed as illustrated in FIG. 12B, and an unlocking operation by the piston retreat prohibition mechanism 190 is performed at a time point (a point indicated by a circle in the figure) before the anti-lock control is started, so that the electric braking force maintaining control is finished. After that, the anti-lock control is executed. A timing of the unlocking operation has been described above in detail, so a detailed description thereof is omitted here. By executing such switching between the controls, the vehicle braking system prevents the electric braking force maintaining control from interfering the anti-lock control. Note that, during a slight time from the end of the electric braking force maintaining control to the start of the anti-lock control, the normal control is performed. Further, the figure illustrates a state where the normal control is performed after the anti-lock control is finished.

[Modification]

In the vehicle braking system of the embodiment, as conditions to start the electric braking force maintaining control and to restore the normal control, the condition related to the request electric braking force is employed. However, in a case of a vehicle not provided with the regenerative braking device or in a state where a regenerative braking force cannot be generated even if the regenerative braking device is provided, a condition related to the request whole braking force may be employed instead of the condition related to the request electric braking force, as described earlier.

The request whole braking force in the vehicle braking system of the embodiment wholly depends on the brakes operation of the driver, except a case of the anti-lock control. In a case of a vehicle that executes automatic driving, and the like, the request whole braking force may be determined without depending on the brakes operation of the driver. It is also possible to apply the electric braking force maintaining control to the request whole braking force determined as such.

In the vehicle braking system of the embodiment, the request whole braking force is determined based on an operation force applied to the brake pedal as a brake operating member. However, for example, the request whole braking force may be determined based on an operation amount of the brake operating member or based on both the operation amount and the operation force thereof.

In the vehicle braking system of the embodiment, as a condition to start the anti-lock control or to restore the normal control from the electric braking force maintaining control at the start of the anti-lock control, the condition related to the wheel rotation speed is employed. Instead of the condition, in a vehicle including a sensor for detecting a longitudinal acceleration of the vehicle, for example, a vehicle running speed may be determined based on the longitudinal acceleration thus detected by the sensor and a condition based on the vehicle running speed may be employed.

The vehicle braking system of the embodiment is configured such that the regenerative braking device, the hydraulic braking device, and the electric braking device are controlled by individual control devices (ECU), respectively. However, the vehicle braking system may be configured such that the regenerative braking device, the hydraulic braking device, and the electric braking device are controlled by a single control device.

The piston retreat prohibition mechanism 190 included in the electric braking device 100 of the vehicle braking system of the embodiment prohibits the retreat of the piston 142 by locking the flange 170 as the interlocking body. However, it is also possible to employ a mechanism to prohibit retreat of a piston such that ratchet teeth are provided in the piston itself so that the piston is directly locked.

What is claimed is:

1. A vehicle braking system comprising:
   a hydraulic braking device provided for either one of a front wheel and a rear wheel and configured to generate a hydraulic braking force depending on a hydraulic pressure of a hydraulic fluid;
   an electric braking device provided for the other one of the front wheel and the rear wheel and configured to generate an electric braking force depending on a force generated by an electric motor,
   the electric braking device including
      a rotor configured to rotate together with the other one of the front wheel and the rear wheel,
      a friction member, and
      an electric brake actuator including the electric motor as a drive source, a piston configured to be advanced by the electric motor to press the friction member against the rotor, and a piston retreat prohibition mechanism configured to prohibit retreat of the piston; and
   a control device configured to control the vehicle braking system, wherein:
      in a control of the electric braking device, the control device is configured to execute
         a normal control to control current application to the electric motor in accordance with a request electric braking force which is requested to the electric braking device, and
         an electric braking force maintaining control to be started instead of the normal control when a setting start condition is satisfied, the electric braking force maintaining control being a control to maintain a maintaining electric braking force without depending on a force of the electric motor, by operating the piston retreat prohibition mechanism and stopping the current application to the electric motor, the maintaining electric braking force being the electric braking force generated by the electric braking device at a time when an operation of the electric braking force maintaining control is started,
      the control device is configured to restore the normal control in a case where the request electric braking force or a change of the request electric braking force exceeds a predetermined setting maintenance limit during the execution of the electric braking force maintaining control, and
      in a control of the hydraulic braking device, the control device is configured to execute a control in accordance with a request hydraulic braking force which is requested to the hydraulic braking device, and to correct the request hydraulic braking force during the execution of the electric braking force maintaining control in a state where a vehicle runs, the request hydraulic braking force being corrected based on a difference between the request electric braking force and the maintaining electric braking force.

2. The vehicle braking system according to claim 1, wherein
   the control device is configured to determine that the setting start condition is satisfied and to start the execution of the electric braking force maintaining control, when the change of the request electric braking force becomes smaller than a setting threshold to brake the vehicle in the state where the vehicle runs.

3. The vehicle braking system according to claim 1, wherein
   the control device is configured to determine that the setting start condition is satisfied and to start the execution of the electric braking force maintaining control, when a generated electric braking force exceeds the request electric braking force to maintain a stop state of the vehicle, in a state where the vehicle stops.

4. The vehicle braking system according to claim 1, wherein
   the control device is configured to determine that the setting maintenance limit is exceeded and to restore the normal control, when the request electric braking force falls below or is expected to fall below the maintaining electric braking force during the execution of the electric braking force maintaining control.

5. The vehicle braking system according to claim 1, wherein
   the control device is configured to determine that the setting maintenance limit is exceeded and to restore the normal control, when the request electric braking force becomes larger than an upper limit braking force obtained by adding a predetermined allowable increment to the maintaining electric braking force during the execution of the electric braking force maintaining control.

6. The vehicle braking system according to claim 1, wherein
   the control device is configured to execute an anti-lock control, and
   the control device is configured to stop the execution of the electric braking force maintaining control in a state where the anti-lock control is executed during the execution of the electric braking force maintaining control.

7. The vehicle braking system according to claim 1, wherein
   the control device is configured to execute a parking control to operate the piston retreat prohibition mechanism at a time when the vehicle is parked.

8. The vehicle braking system according to claim 1, wherein
   the control device is configured to determine a request whole braking force which is requested to a whole of the vehicle, and to determine the request hydraulic braking force and the request electric braking force in accordance with a predetermined setting distribution, based on the request whole braking force.

9. The vehicle braking system according to claim 8, further comprising:
   a regenerative braking device provided for at least one of the front wheel and the rear wheel and configured to generate a regenerative braking force which is using power generation by a rotation of the at least one of the front wheel and the rear wheel, wherein
   the control device is configured to determine the request electric braking force and the request hydraulic braking force in accordance with the predetermined setting distribution, based on an insufficient braking force in the request whole braking force, the insufficient braking force that is not covered by the regenerative braking force.

10. The vehicle braking system according to claim 8, further comprising:
a brake operating member configured to receive a brakes operation by a driver, wherein
the control device is configured determine the request whole braking force in accordance with the brakes operation.

11. The vehicle braking system according to claim 1, wherein:
the piston retreat prohibition mechanism includes
an engaging member configured to be engaged with the piston or an interlocking body moving in conjunction with the piston,
an engaging member moving device configured to move, upon receipt of supply of an energy from outside, the engaging member from a position where the engaging member is not engageable with the piston or the interlocking body to a position where the engaging member is engageable with the piston or the interlocking body, the engaging member moving device being configured to return the engaging member to the position where the engaging member is not engageable with the piston or the interlocking body, when the supply of the energy is stopped, and
a one-way clutch mechanism configured to prohibit the retreat of the piston, and to permit advance of the piston in an engaged state where the engaging member is engaged with the piston or the interlocking body; and
the piston retreat prohibition mechanism is configured such that, in the engaged state, even when the supply of the energy is stopped, the engaged state is maintained unless the piston advances, and when the piston is advanced in the engaged state with the supply of the energy being stopped, the engaged state is released.

* * * * *